United States Patent
Ueno

(10) Patent No.: US 7,230,648 B2
(45) Date of Patent: Jun. 12, 2007

(54) IMAGE SENSING APPARATUS AND METHOD OF FOCUSING AND ENLARGING/REDUCING THE IN-FOCUS IMAGE DATA ON A DISPLAY DEVICE

(75) Inventor: Toshiharu Ueno, Asaka (JP)

(73) Assignee: Fujifilm Corp., Kanagawa (JP)

( * ) Notice: Subject to any disclaimer, the term of this patent is extended or adjusted under 35 U.S.C. 154(b) by 759 days.

(21) Appl. No.: 09/769,513

(22) Filed: Jan. 26, 2001

(65) Prior Publication Data

US 2001/0012072 A1  Aug. 9, 2001

(30) Foreign Application Priority Data

Jan. 27, 2000  (JP)  .............................. 2000-018136

(51) Int. Cl.
*H04N 5/225* (2006.01)
(52) U.S. Cl. .................. 348/340; 348/345; 348/333.01
(58) Field of Classification Search ........... 348/333.01, 348/333.02, 333.03, 333.04, 345, 346, 347, 348/240.99, 240.1, 240.2, 240.3
See application file for complete search history.

(56) References Cited

U.S. PATENT DOCUMENTS

| | | | | |
|---|---|---|---|---|
| 5,282,045 A | * | 1/1994 | Mimura et al. ............. | 348/352 |
| 5,754,348 A | * | 5/1998 | Soohoo ...................... | 359/802 |
| 6,111,605 A | * | 8/2000 | Suzuki ..................... | 348/220.1 |
| 6,522,360 B1 | * | 2/2003 | Miyawaki et al. .......... | 348/347 |
| 6,753,917 B2 | * | 6/2004 | Tanizoe et al. ......... | 348/333.07 |
| 2002/0018136 A1 | * | 2/2002 | Kaji et al. ............. | 348/333.02 |

\* cited by examiner

*Primary Examiner*—Ngoc-Yen Vu
*Assistant Examiner*—Yogesh Aggarawal
(74) *Attorney, Agent, or Firm*—Birch, Stewart, Kolasch & Birch, LLP

(57) ABSTRACT

Disclosed is a digital still camera in which focusing can be checked easily even if a display device constituting the viewfinder is comparatively small. When a shutter-release button is pressed half-way, focusing is performed and the image in a focusing zone is made larger than the part of an angle-of-view confirmation image that corresponds to the focusing zone. An in-focus confirmation image of the enlarged focusing zone is displayed on the display screen of the viewfinder. When focusing is performed, the in-focus confirmation image is enlarged in comparison with the corresponding area of the angle-of-view confirmation image. This makes it easier to determine whether an image is in focus or not.

8 Claims, 24 Drawing Sheets

Fig. 17

| POSITION MOVING BUTTON ||||IN-FOCUS CONFIRMATION IMAGE ENLARGEMENT/ REDUCTION BUTTON | FOCUSING ZONE |
| LEFT | RIGHT | UP | DOWN |||
|---|---|---|---|---|---|
| ○ | — | — | — | — | MOVES ZONE CENTER LEFTWARD |
| — | ○ | — | — | — | MOVES ZONE CENTER RIGHTWARD |
| — | — | ○ | — | — | MOVES ZONE CENTER UPWARD |
| — | — | — | ○ | — | MOVES ZONE CENTER DOWNWARD |
| ○ | — | — | — | ○ | ENLARGES WIDTH |
| — | ○ | — | — | ○ | REDUCES WIDTH |
| — | — | ○ | — | ○ | RAISES HEIGHT |
| — | — | — | ○ | ○ | LOWERS HEIGHT |

IMAGE SENSING APPARATUS AND METHOD OF FOCUSING AND ENLARGING/REDUCING THE IN-FOCUS IMAGE DATA ON A DISPLAY DEVICE

BACKGROUND OF THE INVENTION

1. Field of the Invention

This invention relates to an image sensing apparatus and to a method of controlling the operation thereof, the apparatus having an image sensing unit for sensing the image of a subject via a focusing lens and outputting a video signal representing the image of the subject formed on a photoreceptor surface, as in the manner of a digital still camera or movie video camera, a focus control unit for controlling the focusing lens in such a manner that an image within a focusing zone is formed on the photoreceptor surface, and a display device for displaying the image of the subject, which is for checking the angle of view, represented by the video signal output from the image sensing unit.

2. Description of the Related Art

A liquid crystal display device is provided on, e.g., the back of a digital still camera or movie video camera. The image of a subject that has been sensed is displayed on the display screen of this liquid crystal display device. While observing the image of the subject being displayed, the user decides the angle of view of the image that will be recorded.

The demand for smaller and lighter cameras results inevitably in a smaller display screen for the liquid crystal display device provided on the back of such cameras. A smaller display screen for the liquid crystal display device makes it difficult to determine whether the image of the subject on the screen is in focus.

DISCLOSURE OF THE INVENTION

Accordingly, an object of the present invention is to so arrange it that it is possible to easily determine whether an image is in focus even with a comparatively small display device.

According to the present invention, the foregoing object is attained by providing an image sensing apparatus having an image sensing unit for sensing the image of a subject via a focusing lens and outputting a video signal representing the image of the subject formed on a photoreceptor surface, a focus control unit for controlling the focusing lens in such a manner that an image within a focusing zone is focused on the photoreceptor surface, and a first display device for displaying the image of the subject, which is for confirming angle of view, represented by the video signal output from the image sensing unit, the apparatus comprising: an enlargement unit for applying enlargement processing to the video signal, which has been output from the image sensing unit, in such a manner that an in-focus confirmation image, which corresponds to the focusing zone, in the image of the subject for confirming angle of view is enlarged in comparison with the image of the subject for confirming the angle of view (i.e., in such a manner that the magnification of the in-focus confirmation image is raised); and a second display device for displaying the in-focus confirmation image enlarged by the enlargement unit.

The present invention provides also a method of controlling the operation of the above-described apparatus. Specifically, the present invention provides a method of controlling operation of an image sensing apparatus an image sensing unit for sensing the image of a subject via a focusing lens and outputting a video signal representing the image of the subject formed on a photoreceptor surface, a focus control unit for controlling the focusing lens in such a manner that an image within a focusing zone is focused on the photoreceptor surface, and a first display device for displaying the image of the subject, which is for confirming angle of view, represented by the video signal output from the image sensing unit, the method comprising the steps of: applying enlargement processing to the video signal, which has been output from the image sensing unit, in such a manner that an in-focus confirmation image, which corresponds to the focusing zone, in the image of the subject for confirming angle of view is enlarged in comparison with the image of the subject for confirming angle of view; and displaying the in-focus confirmation image that has been enlarged.

In accordance with the present invention, the video signal (inclusive of an analog video signal and digital image data) is subjected to enlargement processing in such a manner that a focusing image, which corresponds to the focusing zone, in the image of the subject for confirming angle of view displayed on the first display device is enlarged in comparison with the image of the subject for confirming angle of view. The focusing image that has undergone enlargement processing is displayed on the second display device.

Because the focusing image is enlarged in comparison with the image of the subject for confirming angle of view, the state of focusing can be ascertained comparatively easily. Even if the display screen of the liquid crystal display device is small, whether or not the displayed image is in focus can be confirmed comparatively simply.

The first and second display devices may be the same or different. If the first and second display devices are different, the image of the subject for confirming angle of view is displayed on the first display device and the enlarged focusing image is displayed on the second display device. The user can decide the angle of view while observing the image of the subject for confirming angle of view and can determine whether the camera is in focus while observing the enlarged focusing image.

The enlarged focusing image may be displayed on the image for confirming angle of view. This allows the angle of view to be decided and focusing to be confirmed merely by observing the display screen of the same display device.

Capture of the image for confirming angle of view and capture of the enlarged focusing image may be performed one after the other or simultaneously in terms of time.

If a shutter-release button of the type having a two-stage stroke is provided, the enlarged focusing image can be displayed on the second display unit in response to pressing of the shutter-release button through the first stage of its stroke and the video signal output from the image sensing unit can be recorded on a recording medium in response to pressing of the shutter-release button through the second stage of its stroke.

It is preferred that it be possible to change at least one of the position of the focusing zone and enlargement rate of enlargement processing performed by the enlargement unit. Changing the position of the focusing zone will make it possible for the desired part of the image for confirming angle of view to be displayed as the in-focus confirmation image by the user. By changing the enlargement rate, moreover, the in-focus confirmation image can be enlarged so as to make it easier to see.

Furthermore, an arrangement may be adopted in which at least one of the display position and size of the in-focus confirmation image can be changed. This makes it possible to change the display position or size of the in-focus confirmation image so that the user can see the image more easily.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 17 illustrates the status of buttons for moving or enlarging/reducing a focusing zone according to the fifth embodiment;

DESCRIPTION OF THE PREFERRED EMBODIMENTS

Preferred embodiments of the present invention will be described with reference to the drawings.

(1) First Embodiment

Figure 1:
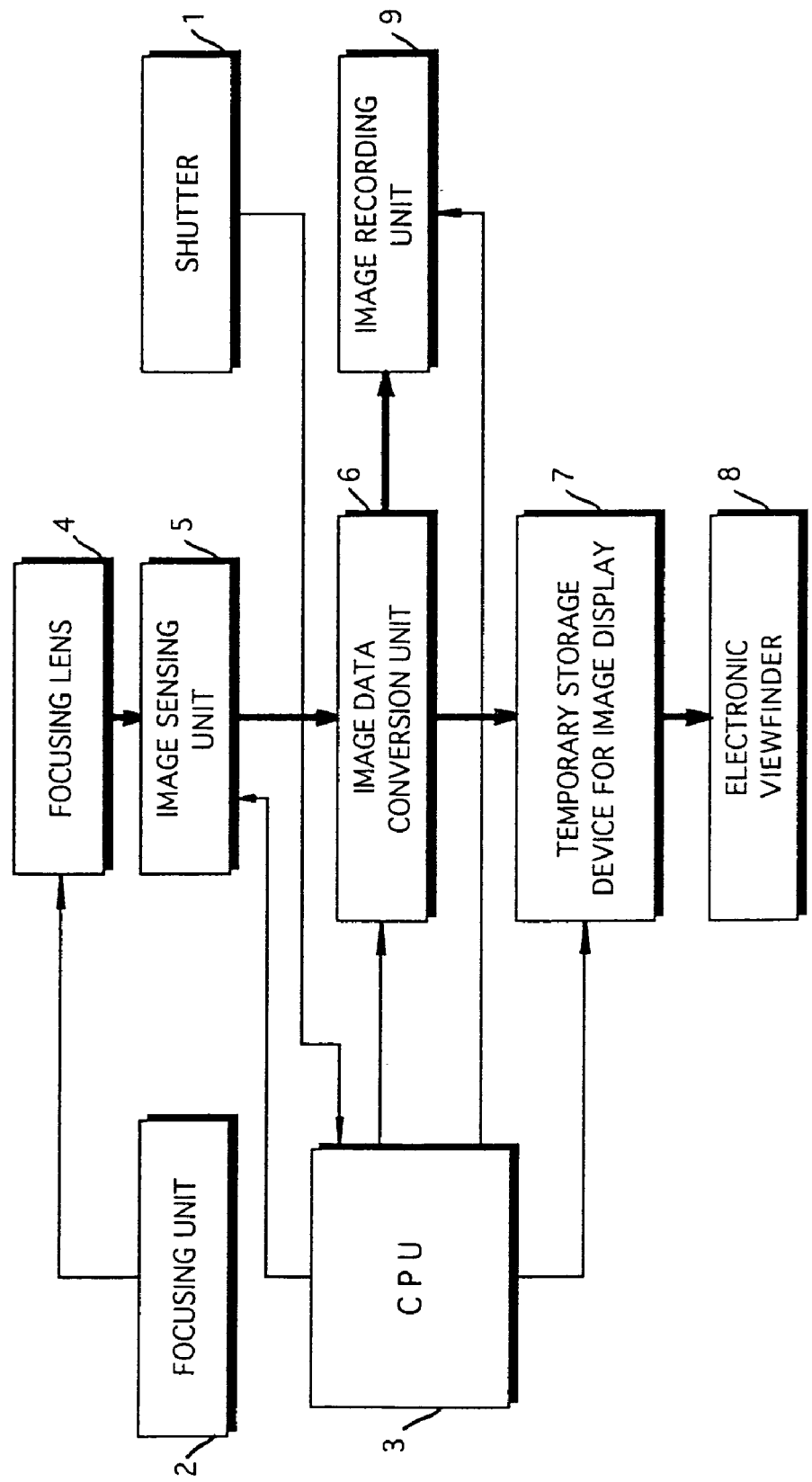
FIG. 1 is a block diagram illustrating the electrical construction of a digital still camera according to a first embodiment.

FIG. 1 is a block diagram illustrating the electrical construction of a digital still camera.

The overall operation of the digital still camera is controlled by a CPU 3.

The digital still camera includes a shutter-release button 1 of two-stroke type. Signals representing depression of the shutter-release button 1 through its half- and full-strokes are input to the CPU 3.

The digital still camera further includes a focusing lens 4 for forming the image of a subject. The focusing lens 4 is controlled by a focusing unit 2 in such a manner that the image of the subject will be focused on the photoreceptor surface of an image sensing unit 5.

When power is introduced to the digital still camera, an image sensing mode is established and the image of a subject is sensed by the image sensing unit 5. Image data representing the image of the subject is output from the image sensing unit 5 and input to an image data conversion unit 6. The image sensing unit 5 incorporates a CCD having 2400 pixels in the horizontal direction and 1800 pixels in the vertical direction, for a total of about 4,000,000 pixels. The image data conversion unit 6 includes a data compression circuit and a correction circuit for enlarging and reducing the size of the image represented by the image data.

Image data output from the image data conversion unit 6 is applied to and stored temporarily in a temporary storage device 7 for an image display. The image data is read out of the temporary storage device 7 and the read data is applied to an electronic viewfinder 8. The image of the subject is displayed as a moving image on the display screen of the electronic viewfinder 8.

If the shutter-release button 1 is pressed through half its stroke, the focusing lens 4 is adjusted by the focusing unit 2 so as to focus the image of the subject of the photoreceptor surface of the image sensing unit 5.

In the digital still camera according to this embodiment, the image data is corrected by the image data conversion unit 6 in such a manner that the magnification of the image being displayed on the display screen of the electronic viewfinder 8 while the focusing lens 4 is being focused will be made larger than that of the image being displayed on the display screen of the electronic viewfinder 8 when the shutter-release button 1 is not being pressed. Since the magnification of the image displayed on the display screen (which has 640 pixels horizontally and 480 pixels vertically) of the electronic viewfinder 8 is thus raised at the time of focusing, whether the image is in focus can be checked comparatively easily. The details of the image data on the electronic viewfinder 8 will be described later.

If the shutter-release button 1 is pressed through its full stroke, the image data representing the image of the subject is compressed by the image data conversion unit 6. The compressed image data is applied to an image recording unit 9 such as a memory card, where the image data is recorded.

Figure 2:
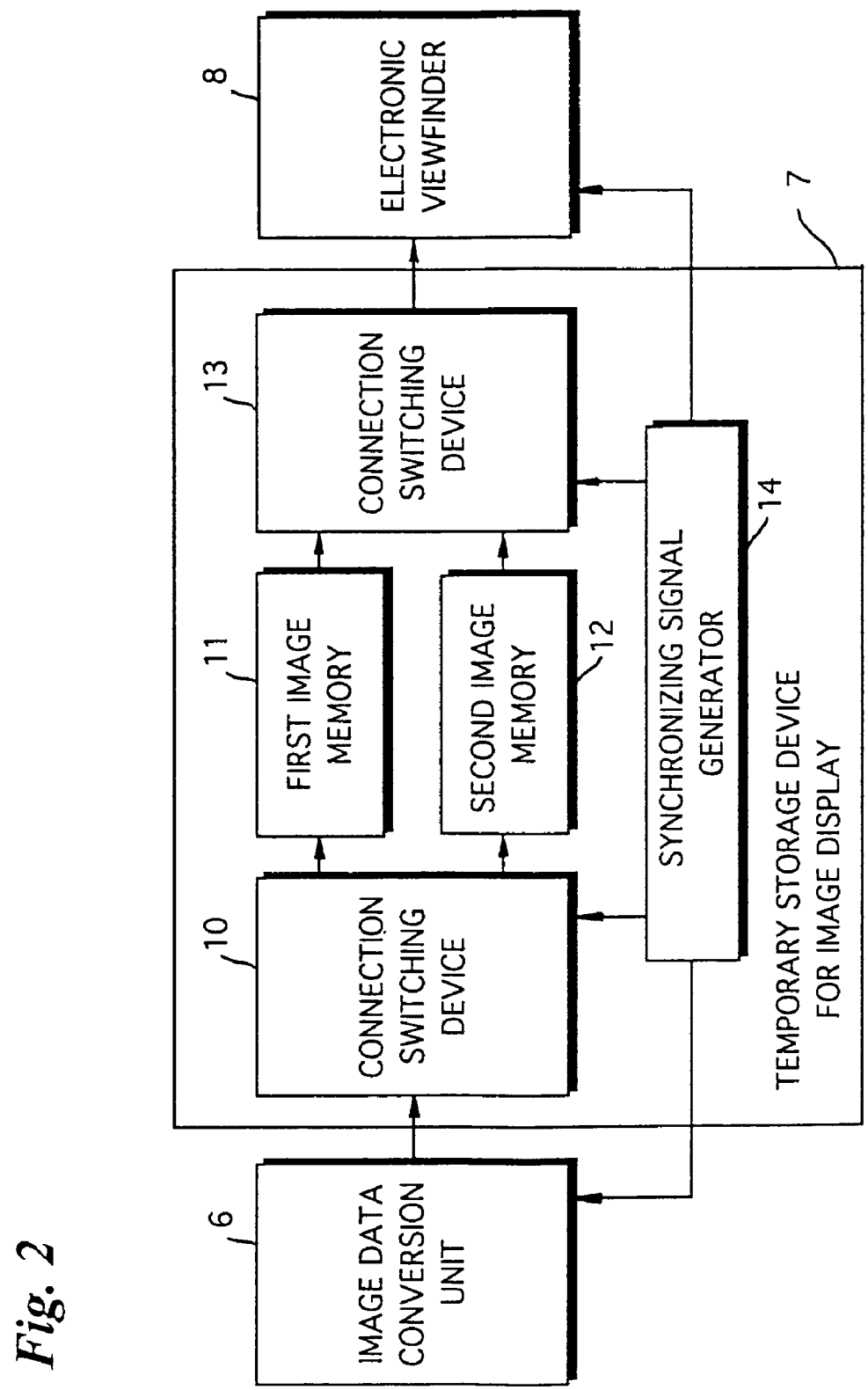
FIG. 2 is a block diagram illustrating the electrical construction of a temporary storage device for an image display according to the first embodiment.

FIG. 2 is a block diagram illustrating the electrical construction of the temporary storage device 7 for the image display.

The temporary storage device 7 includes a synchronizing signal generator 14. A synchronizing signal generated by the synchronizing signal generator 14 is applied to the circuits that construct the temporary storage device 7 and to the image data conversion unit 6 and electronic viewfinder 8.

The temporary storage device 7 further includes a first image memory 11 and a second image memory 12. The first and second image memories 11, 12 both have enough capacity to store one frame's worth of image data.

Image data output from the image data conversion unit 6 is written to either the first image memory 11 or second image memory 12 by switching a connection switching device 10. A connection switching device 13 switches between the first and second image memories 11, 12 so as to read written data out of whichever of these memories was not the one to which image data was just written. This makes it possible to prevent disturbance of the image when the image being displayed on the electronic viewfinder 8 is changed over.

Figure 3:
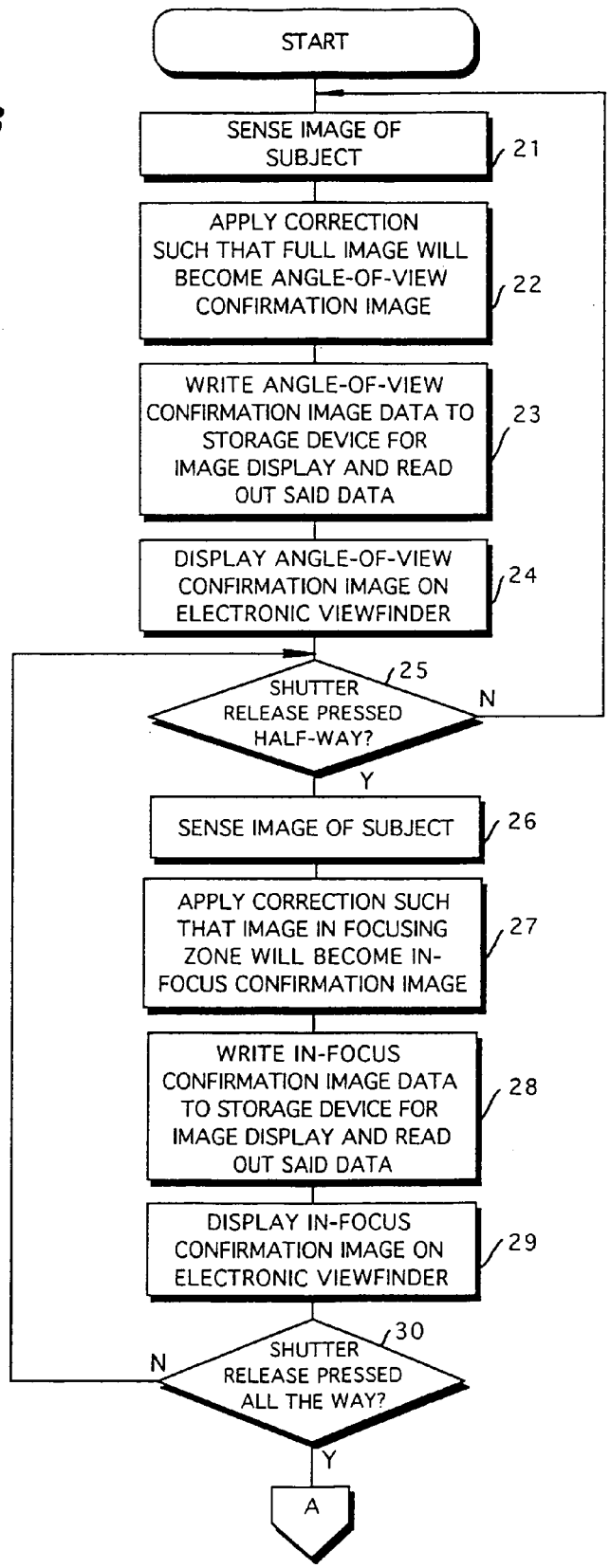
FIGS. 3 and 4 are flowcharts illustrating image-sensing processing executed by the digital still camera according to the first embodiment.
Figure 4:
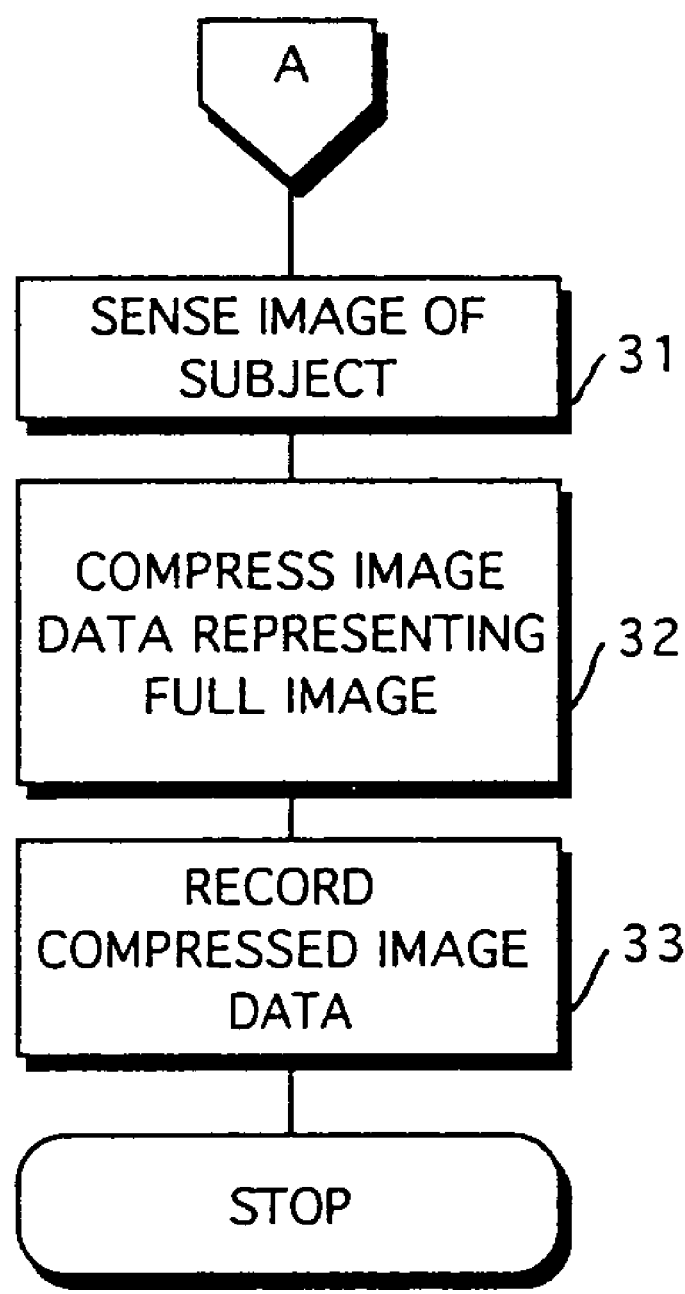
Figure 5:
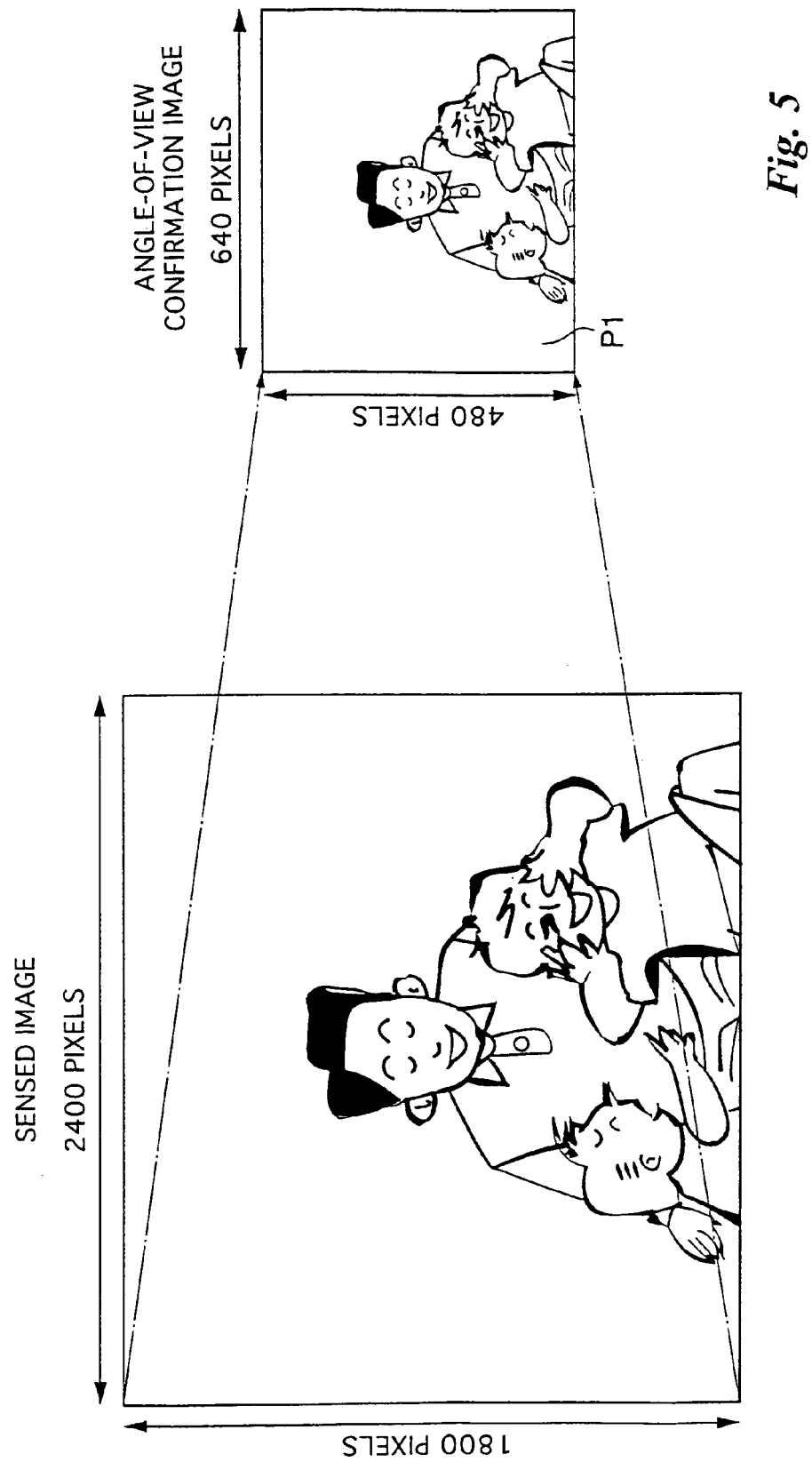
FIGS. 5 to 7 are diagrams illustrating the relationship between a sensed image represented by sensed-image data and an image displayed in an electronic viewfinder according to the first embodiment.
Figure 6:
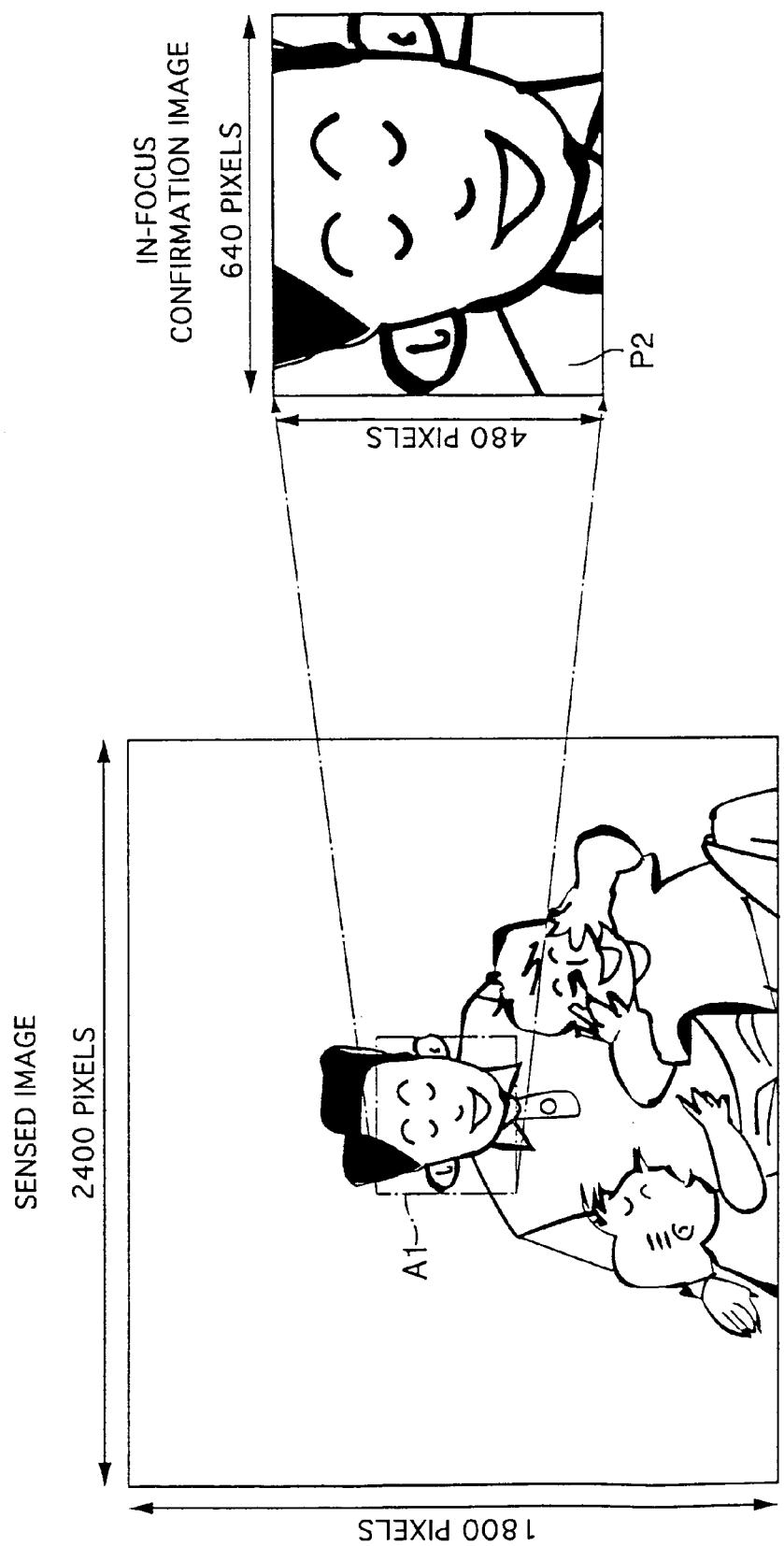

FIGS. 3 and 4 are flowcharts illustrating processing executed when the digital still camera performs photography, FIG. 5 illustrates the relationship between a sensed image and an angle-of-view confirmation image P1, and FIG. 6 illustrates the relationship between a sensed image and in-focus confirmation image P2.

When power is introduced to the digital still camera to establish the image sensing mode, the image of the subject is sensed by the image sensing unit 5 (step 21), as mentioned earlier. Image data representing the image of the subject (the sensed image) is output from the image sensing unit 5 and the image data is subjected to downsampling correction processing in the image data conversion unit 6 in such a manner that the full image obtained by photography will become an image having a number of pixels appropriate for display on the electronic viewfinder 8 (step 22). As a result of such downsampling correction processing, image data representing the image of a subject consisting of 2400 pixels in the horizontal direction and 1800 pixels in the vertical direction becomes angle-of-view confirmation image data consisting of 640 pixels in the horizontal direction and 480 pixels in the vertical direction.

The angle-of-view confirmation image data is supplied from the image data conversion unit 6 to the temporary storage device 7 for image display, where the image data is stored in either the first image memory 11 or second image memory 12, as described above (step 23). The angle-of-view confirmation image data is read out of the temporary storage device 7 and applied to the electronic viewfinder 8. As a result, the angle-of-view confirmation image P1 obtained by imaging is displayed on the display screen of the electronic viewfinder 8 (step 24) (see FIG. 5).

If the shutter-release button 1 is pressed half-way ("YES" at step 25), focusing of the focusing lens 4 is controlled by the focusing unit 2. The image of the subject is sensed by the image sensing unit 5 (step 26) and image data representing the image of the subject is input to the image data conversion unit 6. The image data is subjected to downsampling correction processing (step 27) in such a manner that the image of a focusing zone A1 consisting of 600 pixels horizontally and 450 pixels vertically in the full area of photography becomes the in-focus confirmation image P2 displayed on the display screen of the electronic viewfinder 8, as depicted in FIG. 6. Owing to execution of the downsampling correction, in-focus confirmation image data representing the in-focus confirmation image P2 is written to the temporary storage device 7 and then is read out (step 28). The in-focus confirmation image data read out is applied to the electronic viewfinder 8. As a result, as illustrated in FIG. 6, the image in the focusing zone (the in-focus confirmation image P2) is displayed upon having its magnification enlarged in comparison with the usual size of the viewfinder image as shown in FIG. 5. Since the in-focus confirmation image P2 has a magnification higher than that of the angle-of-view confirmation image P1, the state of focusing can be checked with comparative ease even if the display screen of the electronic viewfinder 8 is small.

The processing of steps 25 to 29 is repeated while the shutter-release button 1 is being pressed half-way. If the shutter-release button 1 is pressed all the way ("YES" at step 30), then the image of the subject is sensed again by the image sensing unit 5 after a fixed period of time (e.g., 1/60 of a second) and image data representing the image of the subject is input to the image data conversion unit 6 (step 31). The image data representing the full image obtained by photography is compressed by the image data conversion unit 6 (step 32). The compressed image data is applied to an image recording unit 9, where the image data is recorded (step 33).

(2) Second Embodiment

Figure 7:
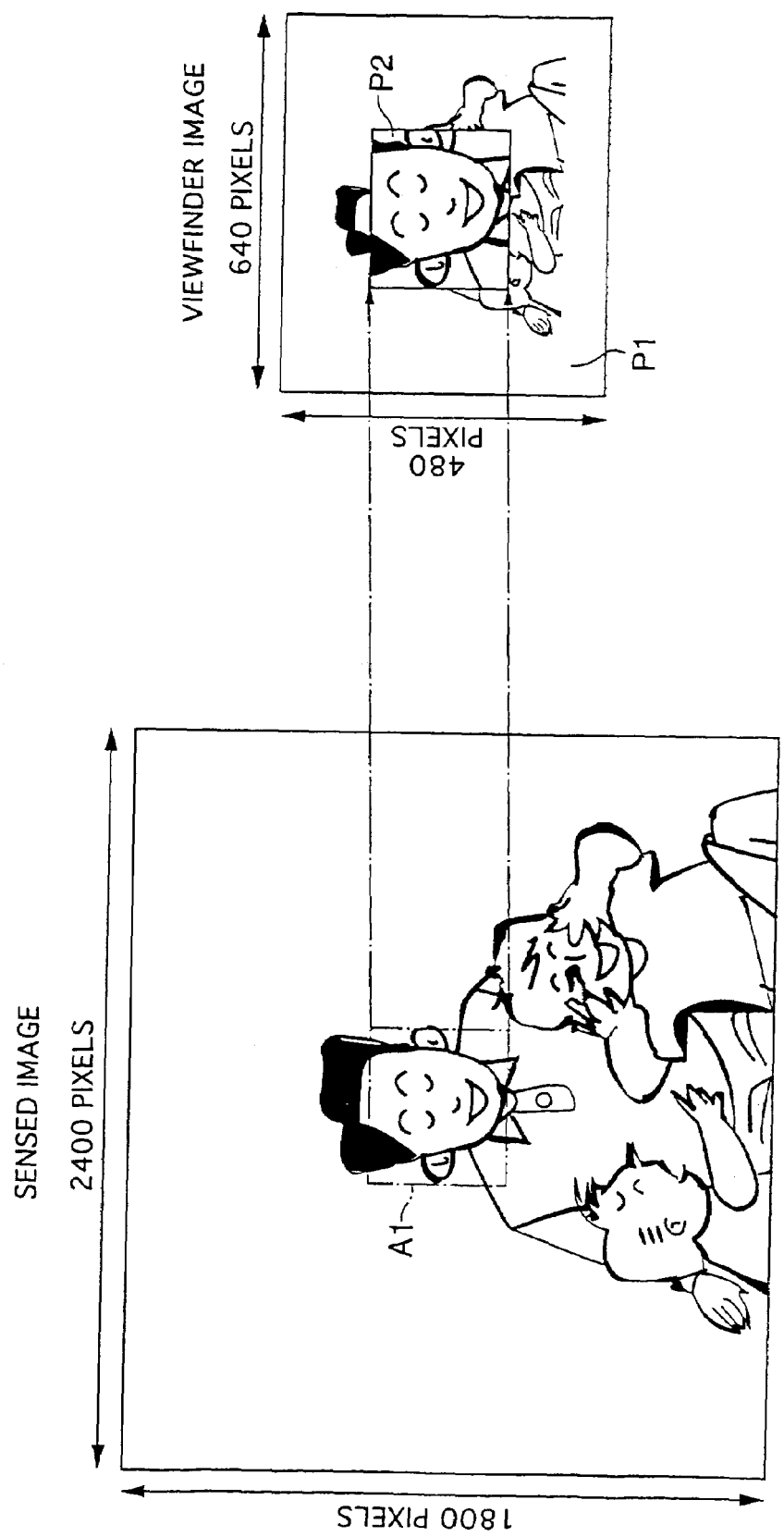

In the first embodiment, the image in the focusing zone A1 is subjected to correction processing so as to be displayed over the full display screen of the electronic viewfinder 8 in the manner shown in FIG. 6. In the second embodiment, however, the angle-of-view confirmation image P1, which is a reduced image of the full image of the subject obtained by photography, is displayed on the entire display screen of the electronic viewfinder 8, as shown in FIG. 7, and the in-focus confirmation image P2, which has a magnification greater than that of the angle-of-view confirmation image P1, is displayed in a form superimposed on the angle-of-view confirmation image P1.

The digital still camera having the construction shown in FIG. 1 is used in the second embodiment as well.

Figure 8:
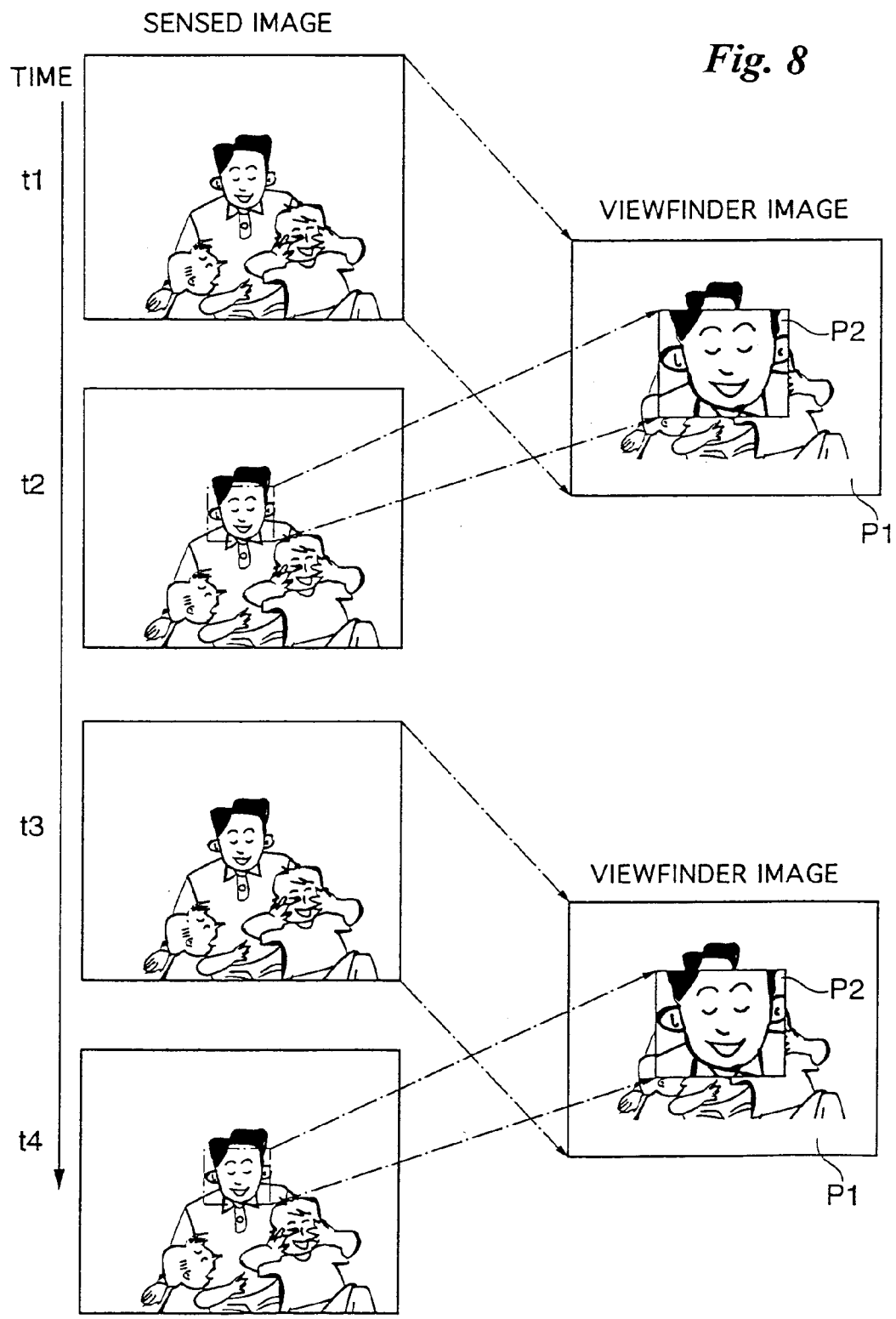
FIG. 8 illustrates the manner in which an image displayed in an electronic viewfinder is generated according to a second embodiment.
Figure 9:
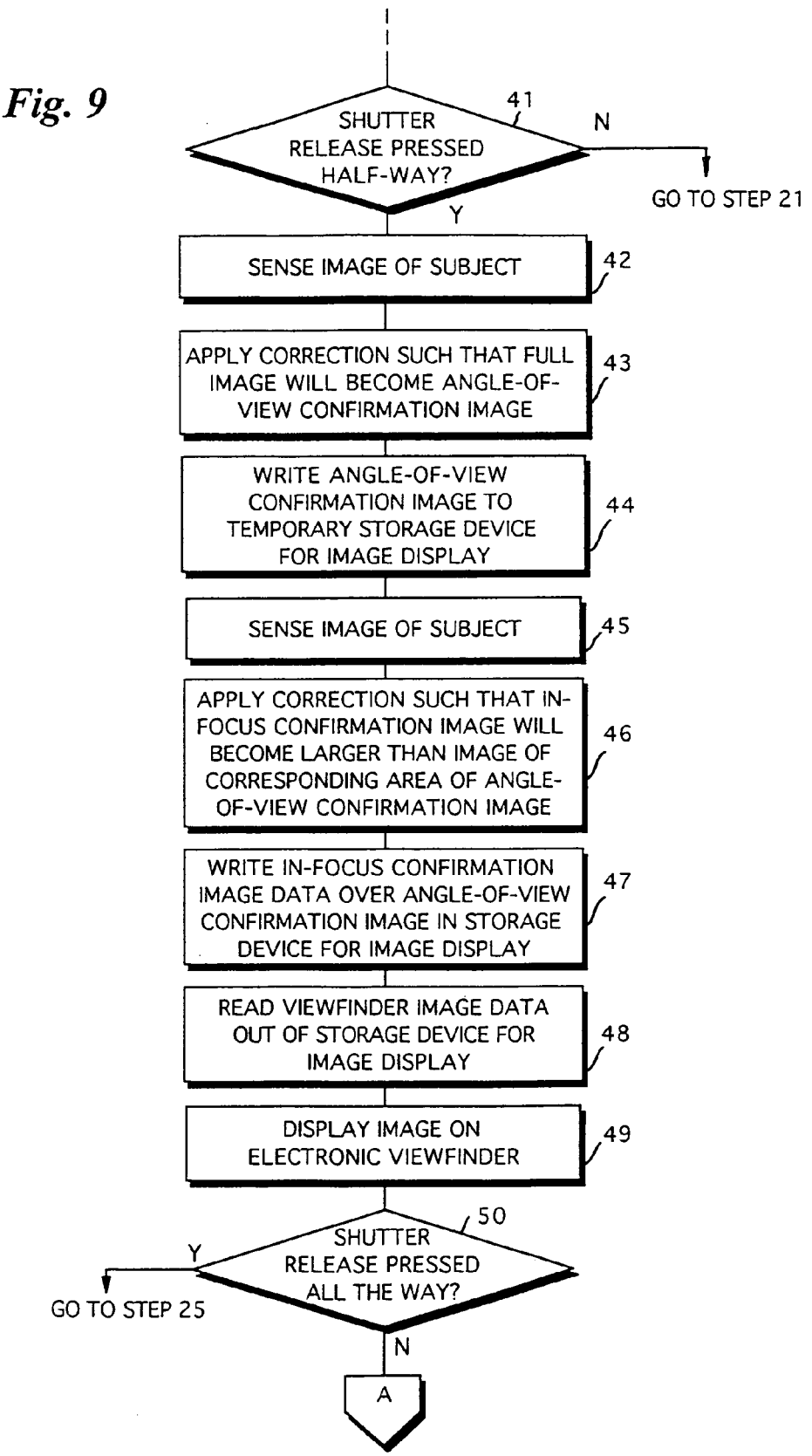
FIG. 9 is a flowchart illustrating part of the image-sensing processing executed by the digital still camera according to the second embodiment.

As mentioned above, FIG. 7 illustrates the full sensed image obtained by photography and the image displayed on the display screen of the electronic viewfinder 8. FIG. 8 illustrates the manner in which an image displayed on the electronic viewfinder 8 is generated, and FIG. 9 is a flowchart illustrating part of the photographic processing executed by the digital still camera.

If the shutter-release button 1 is pressed half-way ("YES" at step 41), the image of the subject is sensed by the image sensing unit 5 at time t1 and the image data representing the sensed image is input to the image data conversion unit 6 (step 42), as described earlier. Angle-of-view confirmation image data representing the angle-of-view confirmation image P1 consisting of 640 pixels horizontally and 480 pixels vertically is generated in such a manner that the angle-of-view confirmation image P1 of the full image obtained by photography will be displayed on the display screen of the electronic viewfinder 8 (step 43). The generated angle-of-view confirmation image data is written to the temporary storage device 7 for image display (step 44).

The image of the subject is sensed again by the image sensing unit 5 at time t2 after a fixed period of time and the image data representing the sensed image of the full size obtained by photography is output from the image sensing unit 5 (step 45). Downsampling correction processing is applied by the image data conversion unit 6 in such a manner that the image in the focusing zone A1 will have its magnification made larger than that of the image of the corresponding area of the angle-of-view confirmation image P1 (step 46). The in-focus confirmation image data is written to the temporary storage device 7 in such a manner that the in-focus confirmation image P2 is written over the angle-of-view confirmation image P1 (step 47).

Viewfinder image data representing the image (viewfinder image) in which the in-focus confirmation image P2 is written over the angle-of-view confirmation image P1 is read out of the temporary storage device 7 and applied to the electronic viewfinder 8 (step 48). As a result, the in-focus confirmation image P2 is displayed on the display screen of the electronic viewfinder 8 in a form written over the angle-of-view confirmation image P1 representing the full area of photography (step 49). The angle of view of the entire area of photography can be ascertained from the angle-of-view confirmation image P1. Since the angle-of-view confirmation image P1 written over the in-focus confirmation image P2 has a higher magnification, the fact that it is in focus can be confirmed comparatively easily.

It goes without saying that if the shutter-release button 1 is pressed all the way ("YES" at step 50), the image data representing the full image of the subject in the area of photography is compressed and the compressed image data is recorded in the image recording unit 9 (see FIG. 4) in the manner described above.

(3) Third Embodiment

In the second embodiment, the viewfinder image, in which the in-focus confirmation image P2 is written over the angle-of-view confirmation image P1 of the full area of photography, is generated from images of two separate frames, as illustrated in FIG. 8. As a consequence, the angle-of-view confirmation image P1 of the full area of photography and the in-focus confirmation image P2 written over the image P1 are not coincident in time (time t2–t1). The third embodiment is such that a viewfinder image obtained from images captured simultaneously is displayed on the display screen of the electronic viewfinder 8.

Figure 10:
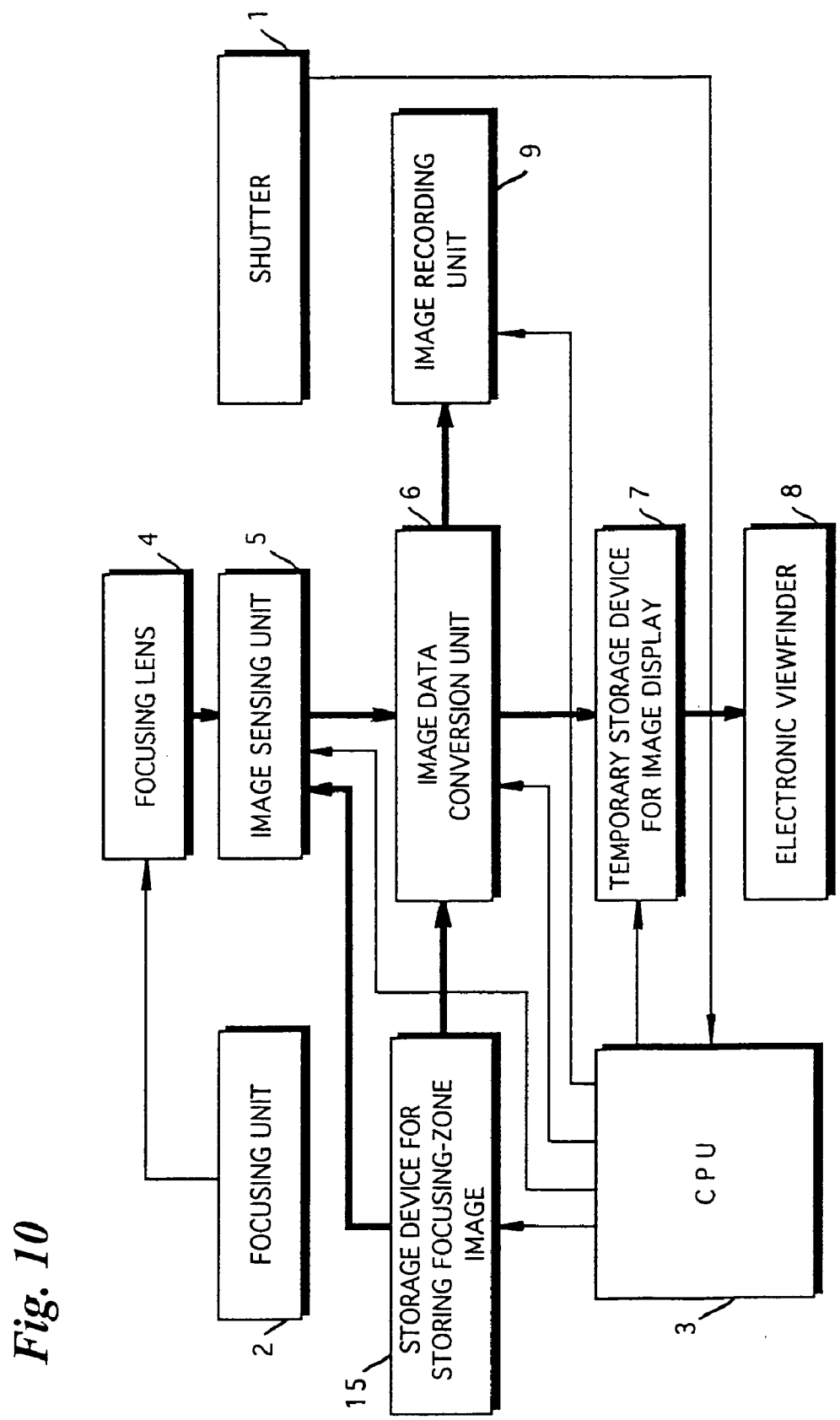
FIG. 10 is a block diagram illustrating the electrical construction of the digital still camera according to a third embodiment.
Figure 11:
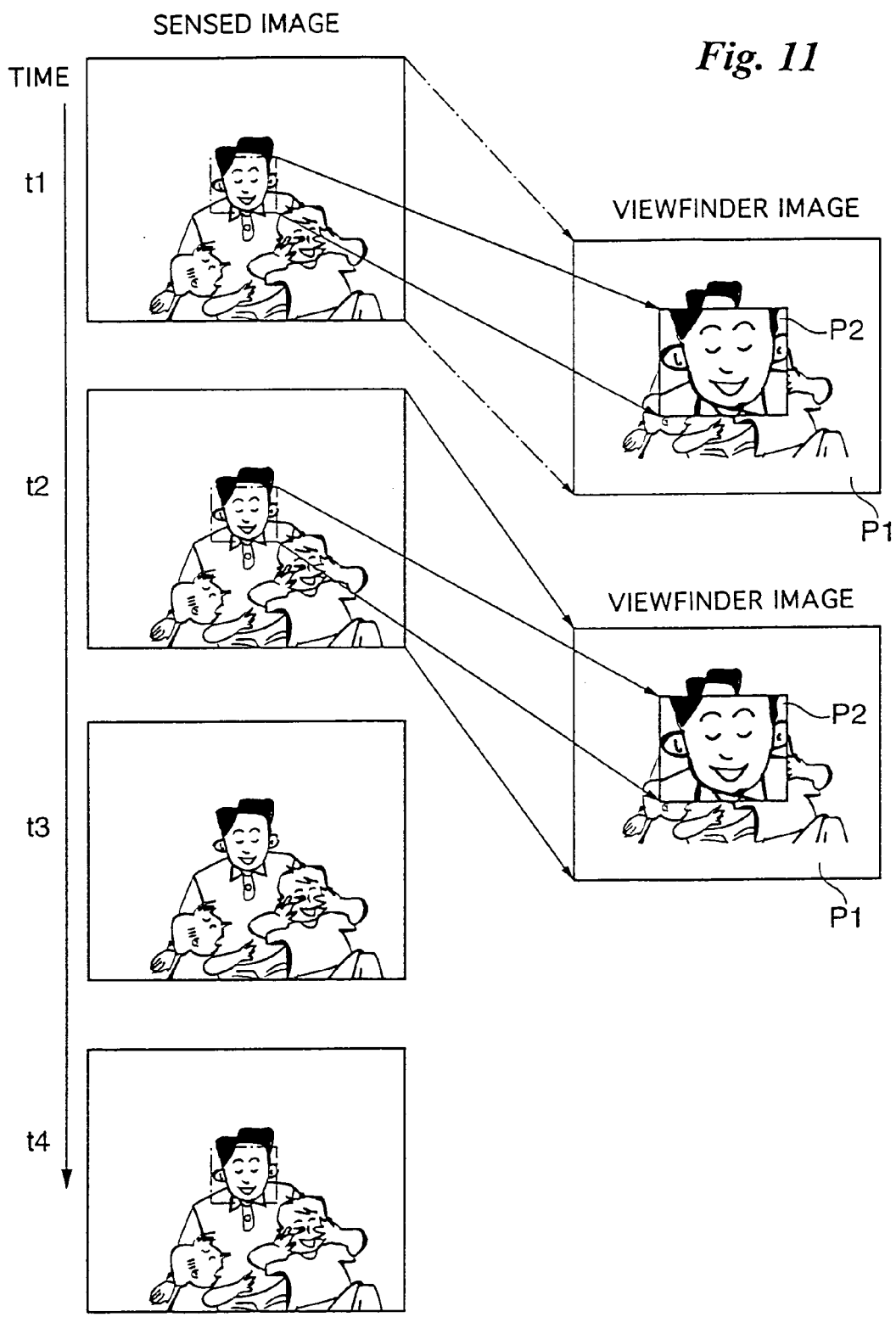
FIG. 11 illustrates the manner in which an image displayed in an electronic viewfinder is generated according to the third embodiment.
Figure 12:
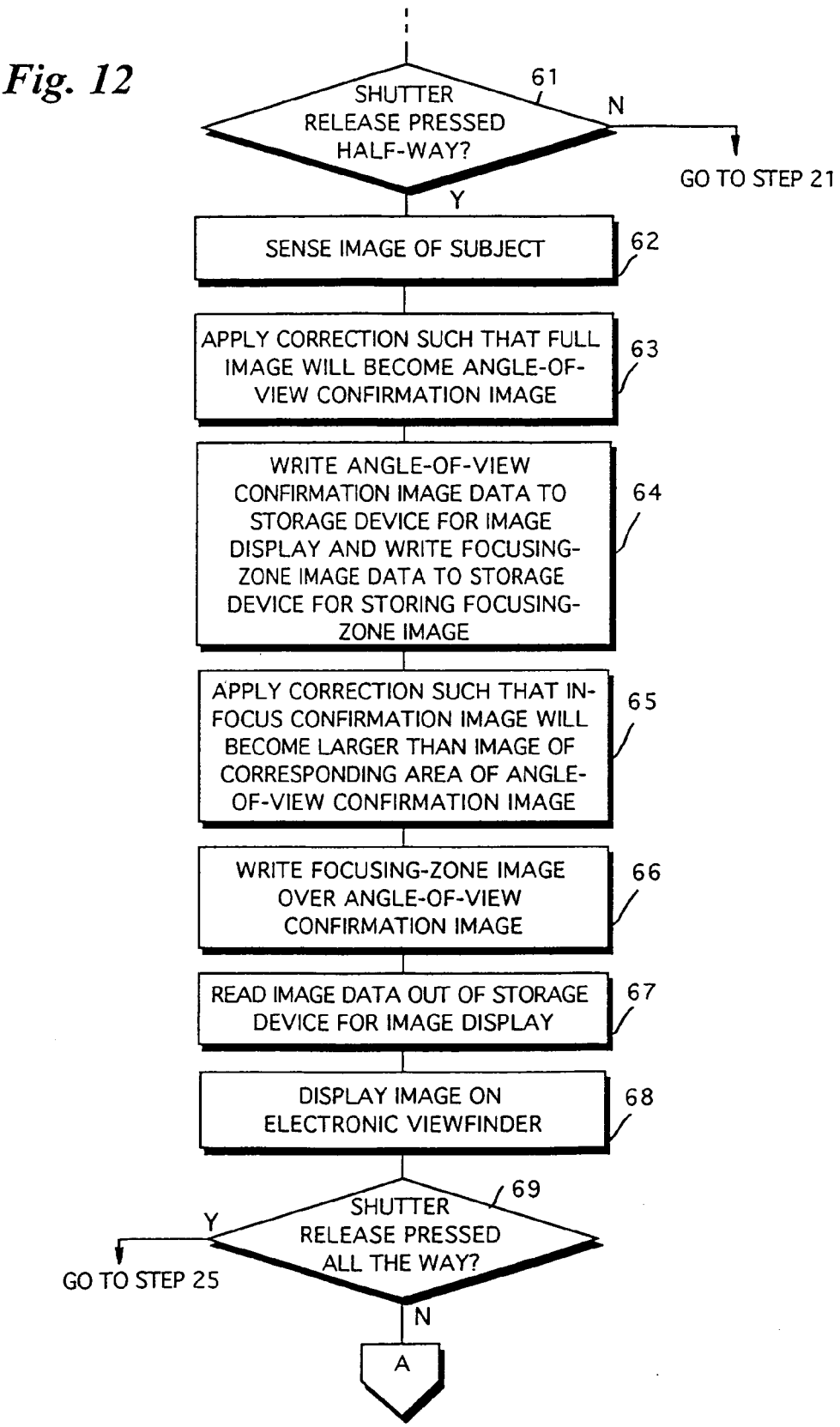
FIG. 12 is a flowchart illustrating part of the image-sensing processing executed by the digital still camera according to the third embodiment.

FIG. 10 is a block diagram illustrating the electrical construction of the digital still camera, and FIG. 11 illustrates the manner in which an electronic viewfinder image having the in-focus confirmation image P2 written over it is generated. FIG. 12 is a flowchart illustrating part of the image-sensing processing executed by the digital still camera. Components shown in FIG. 10 identical with those of FIG. 1 are designated by like reference characters and need not be described again.

The digital still camera according to the third embodiment differs from the digital still cameras of the first and second embodiments in that it is provided anew with a storage device 15 for storing a focusing-zone image.

If the shutter-release button 1 is pressed half-way ("YES" at step 61), the image of the subject is sensed (step 62) by the image sensing unit 5 and downsampling correction processing is applied to generate the angle-of-view confirmation image P1 (step 63). The angle-of-view confirmation image data generated in the image data conversion unit 6 is written to the temporary storage device 7 for image display (step 64). Image data of the same frame as that of the image data input to the image data conversion unit 6 is input also from the image sensing unit 5 to the storage device 15 for the focusing-zone image. The image data of the focusing zone A1 from the full area of photography is stored in the storage device 15 for the focusing-zone image (step 64).

The image data of the focusing zone A1 that has been stored in the storage device 15 for the focusing-zone image is input to the image data conversion unit 6, whereby downsampling correction processing is applied in such a manner that the magnification of the in-focus confirmation image P2 will be made greater than that of the image in the corresponding area of the angle-of-view confirmation image P1 (step 65), as described earlier. The in-focus confirmation image data is written to the temporary storage device 7 for image display in such a manner that the in-focus confirmation image P2 is superimposed on the angle-of-view confirmation image P1 (step 66).

Image data representing the angle-of-view confirmation image P1 over which the in-focus confirmation image P2 has been written is read out of the temporary storage device 7 (step 67) and applied to the electronic viewfinder 8. As a result, the angle-of-view confirmation image P1 over which the in-focus confirmation image P2 has been written is displayed on the display screen of the electronic viewfinder 8 (step 68). By subsequently pressing the shutter-release button 1 all the way ("YES" at step 69), the image data representing the full area of photography is recorded in the image recording unit 9. This operation is similar to that of the foregoing embodiments.

(4) Fourth Embodiment

Figure 13:
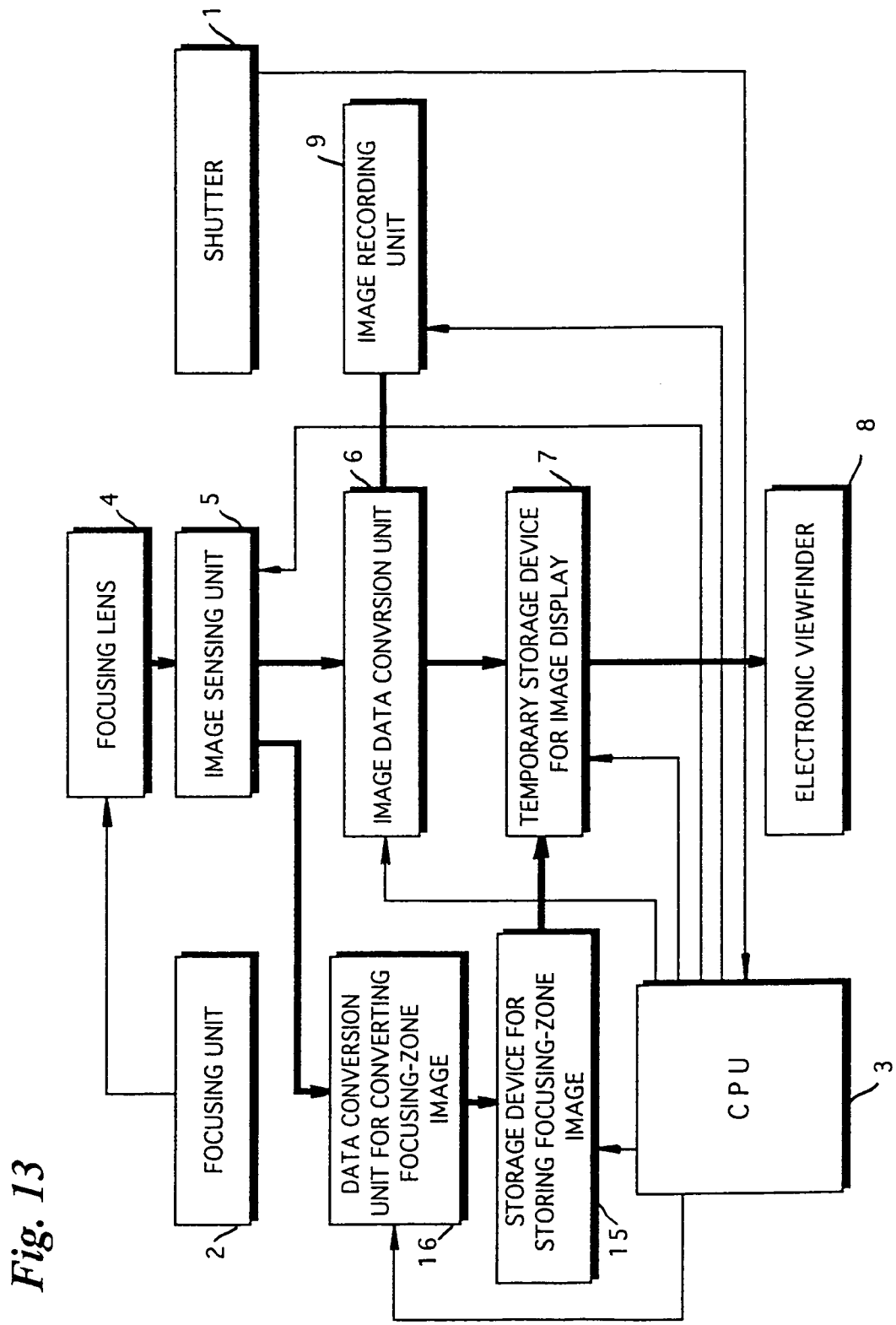
FIG. 13 is a block diagram illustrating the electrical construction of a digital still camera according to a fourth embodiment.
Figure 14:
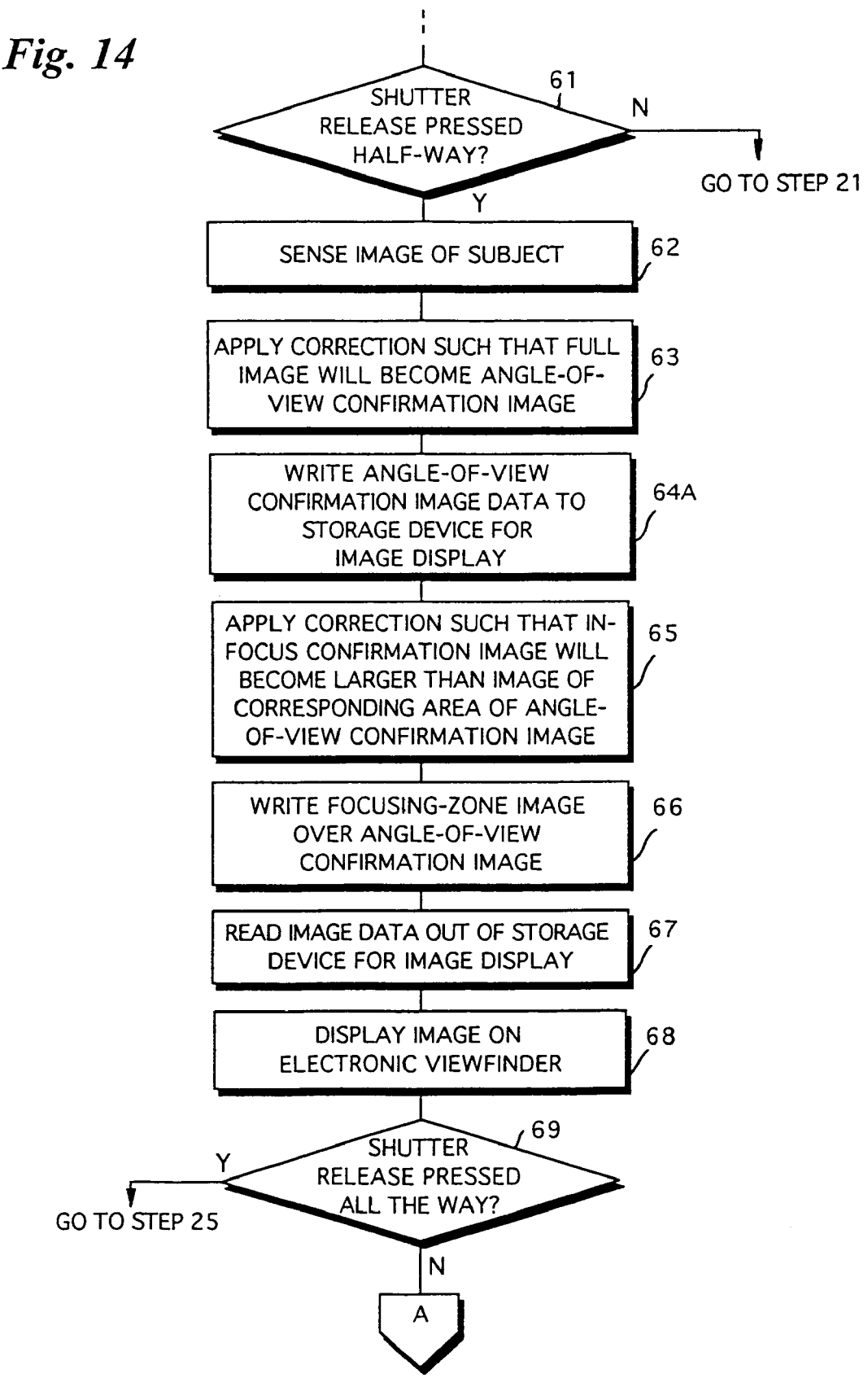
FIG. 14 is a flowchart illustrating part of image-sensing processing executed by the digital still camera according to the fourth embodiment.

FIGS. 13 and 14 illustrate a fourth embodiment, in which FIG. 13 is a block diagram illustrating the electrical construction of the digital still camera and FIG. 14 a flowchart illustrating part of the image-sensing processing executed by the digital still camera.

Components shown in FIG. 13 identical with those of FIG. 10 are designated by like reference characters and need not be described again. Further, processing steps shown in FIG. 14 identical with those of FIG. 11 are designated by like step numbers and need not be described again.

The digital still camera shown in FIG. 13 is provided with a data conversion unit 16 for converting focusing-zone image data. The data conversion unit 16 subjects the in-focus confirmation image data in the image data output from the image sensing unit 5 to downsampling correction processing in such a manner that the magnification thereof is made greater than that of the image that corresponds to the focusing zone within the angle-of-view confirmation image P1 in the manner described above.

The image data representing the full area of photography output from the image sensing unit 5 is converted in the data conversion unit 16 and written to the temporary storage device 7 for image display (step 64A).

Image data identical with the image data representing the full area of photography written to the temporary storage device 7 is applied to the data conversion unit 16. As described above, the in-focus confirmation image data is subjected to correction processing in the data conversion unit 16 in such a manner that the magnification thereof is made greater than that of the image that corresponds to the focusing zone within the angle-of-view confirmation image P1 (step 65).

The in-focus confirmation image data that has undergone downsampling correction processing is applied to the storage device 15 for the focusing-zone image and is written to the storage device as set forth above (step 66). The data is subsequently read out of the storage device 15 and applied to the temporary storage device 7 for image display. The in-focus confirmation image data is written over the angle-of-view confirmation image data in such a manner that the in-focus confirmation image P2 having a magnification greater than that of the image in the focusing zone is written over the angle-of-view confirmation image P1.

Thus, the in-focus confirmation image P2 of increased magnification is displayed on the display screen of the electronic viewfinder 8 in a form written over the angle-of-view confirmation image P1, as shown in FIG. 7.

In accordance with the arrangement shown in FIG. 13, image data that has undergone downsampling correction processing is written to the storage device 15 for the focusing-zone image. This means that the storage device 15 used can have a smaller capacity.

(5) Fifth Embodiment

FIGS. 15 to 20 illustrate a fifth embodiment. The fifth embodiment makes it possible to move and to enlarge the focusing zone. The position of the area where the in-focus confirmation image is displayed (the in-focus image display area) is fixed. It goes without saying that the position of the in-focus image display area can be made movable, as will be described below.

Figure 15:
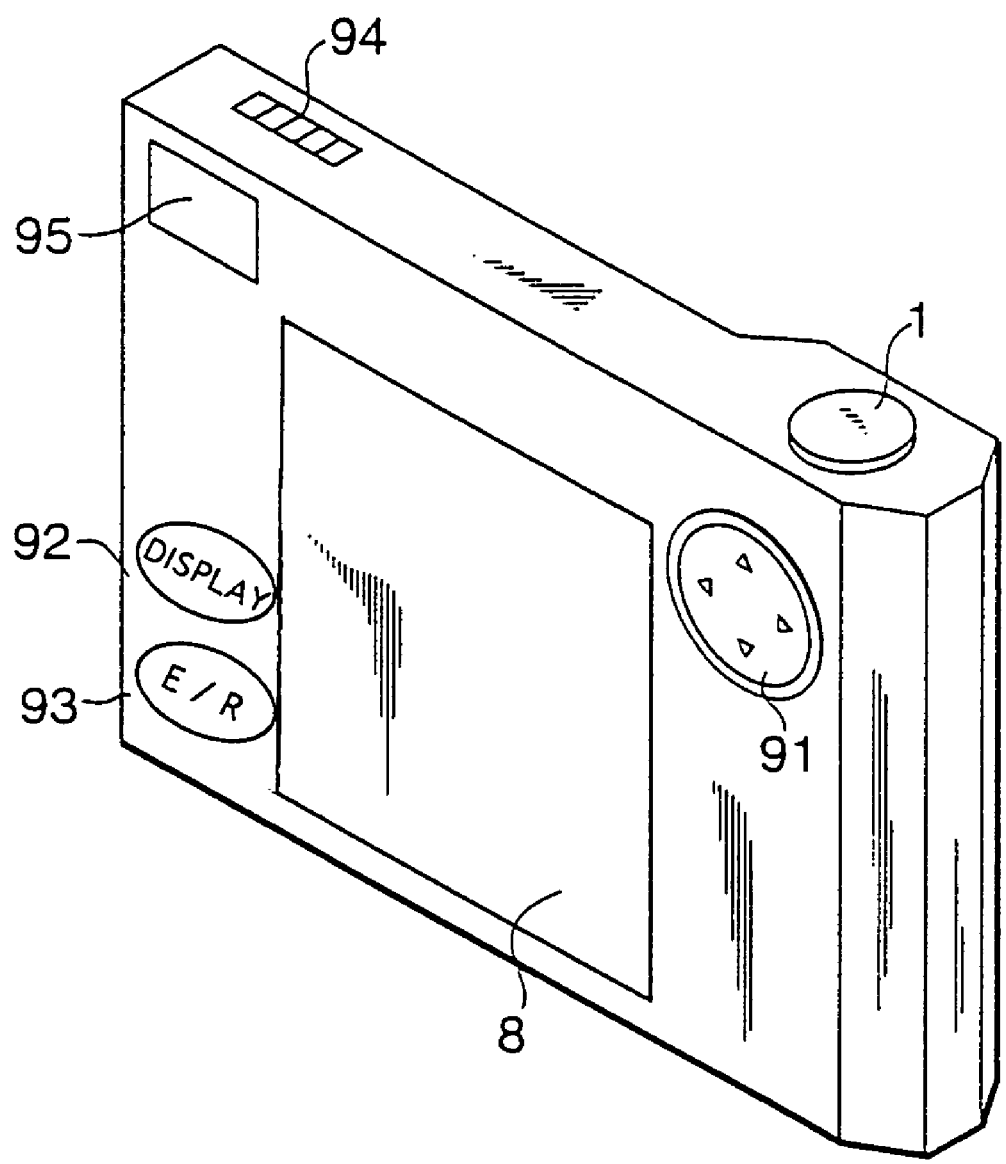
FIG. 15 is a perspective view of a digital still camera according to a fifth embodiment.

FIG. 15 is a perspective view of a digital still camera as seen from the back thereof.

The back side of the digital still camera is provided with a display screen 99, which belongs to the above-described image viewfinder 8, extending over almost the entire surface of the camera back. An optical viewfinder 95 is formed at the upper left of the display screen 99.

Provided at the upper right of the display screen 99 is a move button 91 for applying a command to move the focusing zone. Up, down, left and right arrows are formed on the move button 91 so as to be capable of being pushed. Provided at the lower left of the display screen 99 are an in-focus confirmation image display button 92 for applying a command to display the in-focus confirmation image on the display screen 99, and an in-focus confirmation image enlargement/reduction button 93 for applying a command to enlarge the focusing zone.

The shutter-release button 1 is provided on the top of the digital still camera on the right side thereof, and a power switch 94 is provided on the top of the digital still camera on the left side thereof.

Figure 16:
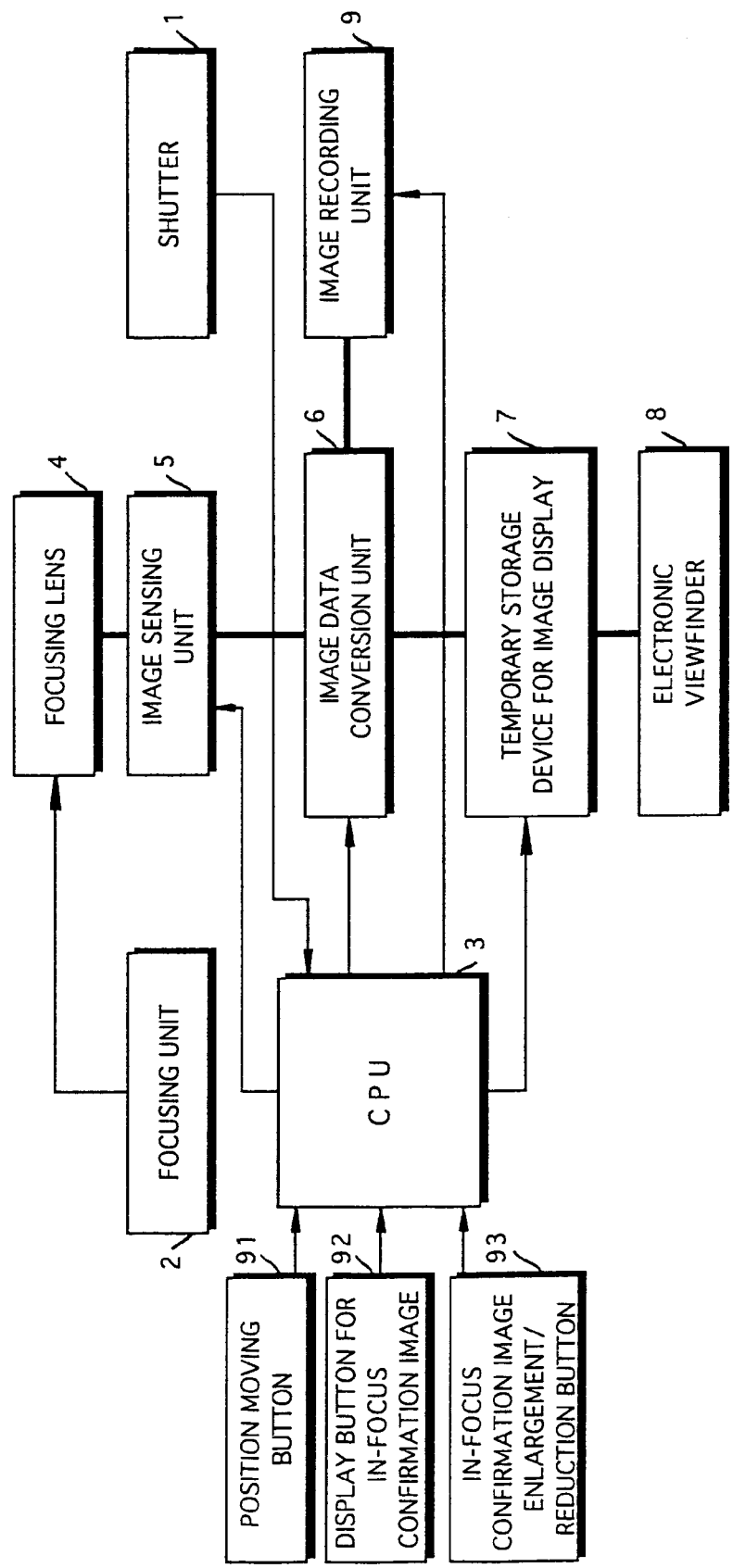
FIG. 16 is a block diagram illustrating the electrical construction of the digital still camera according to the fifth embodiment.

FIG. 16 is a block diagram illustrating the electrical construction of the digital still camera. Circuits in FIG. 16 identical with those shown in FIG. 1 are designated by like reference characters and need not be described again.

Signals indicating depression of the position moving button 91, in-focus confirmation image display button 92 and an in-focus confirmation image enlargement/reduction button 93 enter the CPU 3. The focusing zone is moved and enlarged or reduced in size, as will be described later, on the basis of these signals from the buttons 91, 92 and 93.

FIG. 17 illustrates the relationship between depression of the position moving button 91 and in-focus confirmation image enlargement/reduction button 93 and movement and enlargement/reduction of the focusing zone. A circle mark in FIG. 17 indicate depression of the button.

The direction in which the focusing zone is to be moved is decided solely by the position moving button 91. If an arrow on the position moving button 91 is pressed, the focusing zone moves in the direction indicated by the pressed arrow. Amount of movement is decided by how long the arrow formed on the position moving button 91 is pressed. The longer the arrow is pressed, the greater the amount of movement.

Enlargement or reduction of the size of the focusing zone is implemented by an enlarge or reduce command decided by the combination of the position moving button 91 and enlargement/reduction button 93 pressed. For example, if the left arrow of the position moving button 91 and the enlargement/reduction button 93 are pressed simultaneously, the width of the focusing zone increases. If the right arrow of the position moving button 91 and the enlargement/reduction button 93 are pressed simultaneously, the width of the focusing zone decreases. If the up arrow of the position moving button 91 and the enlargement/reduction button 93 are pressed simultaneously, the height of the focusing zone increases. If the down arrow of the position moving button 91 and the enlargement/reduction button 93 are pressed simultaneously, the height of the focusing zone decreases.

Figure 18:
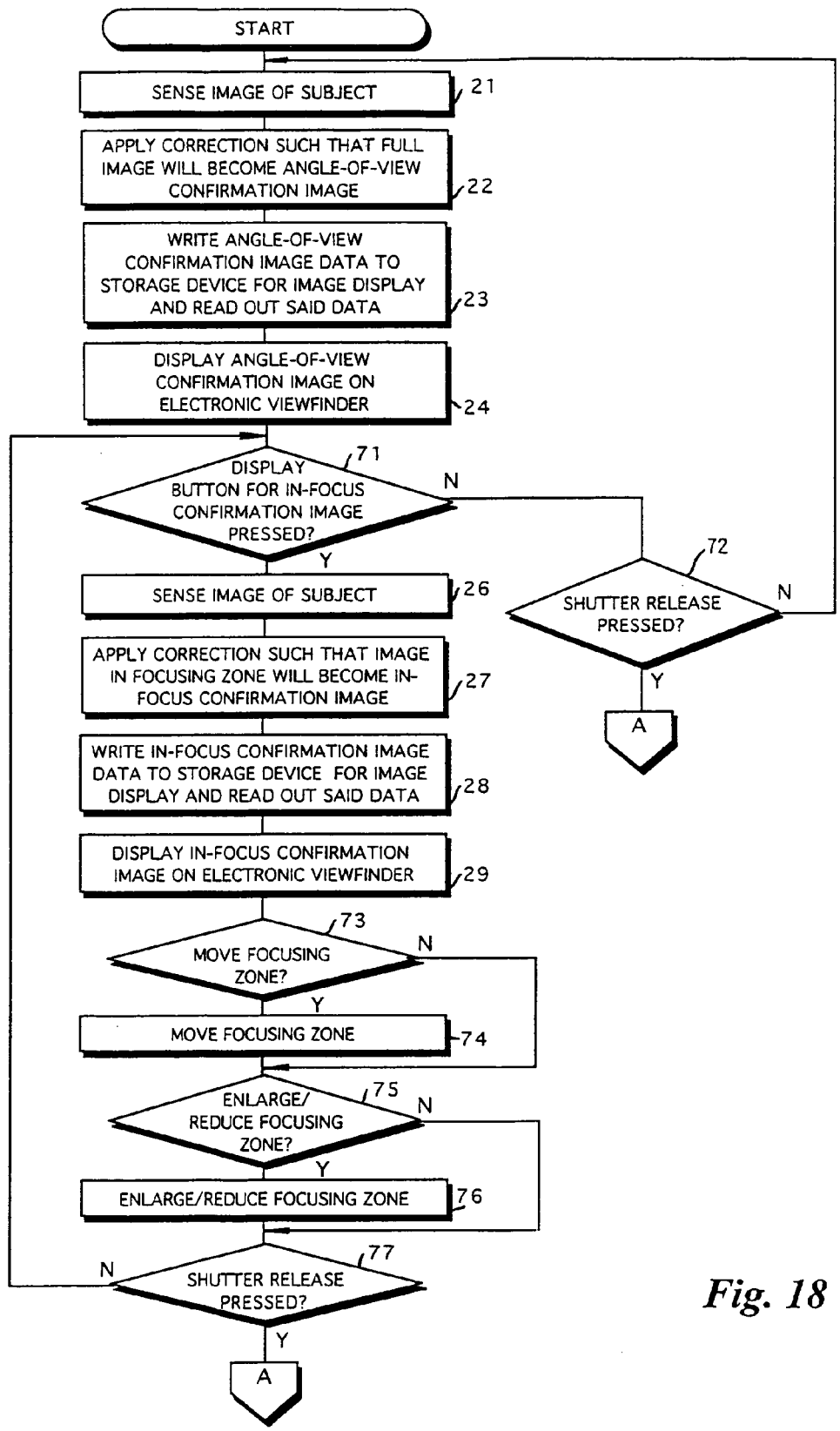
FIG. 18 is a flowchart illustrating part of the processing executed by the digital still camera according to the fifth embodiment.
Figure 19:
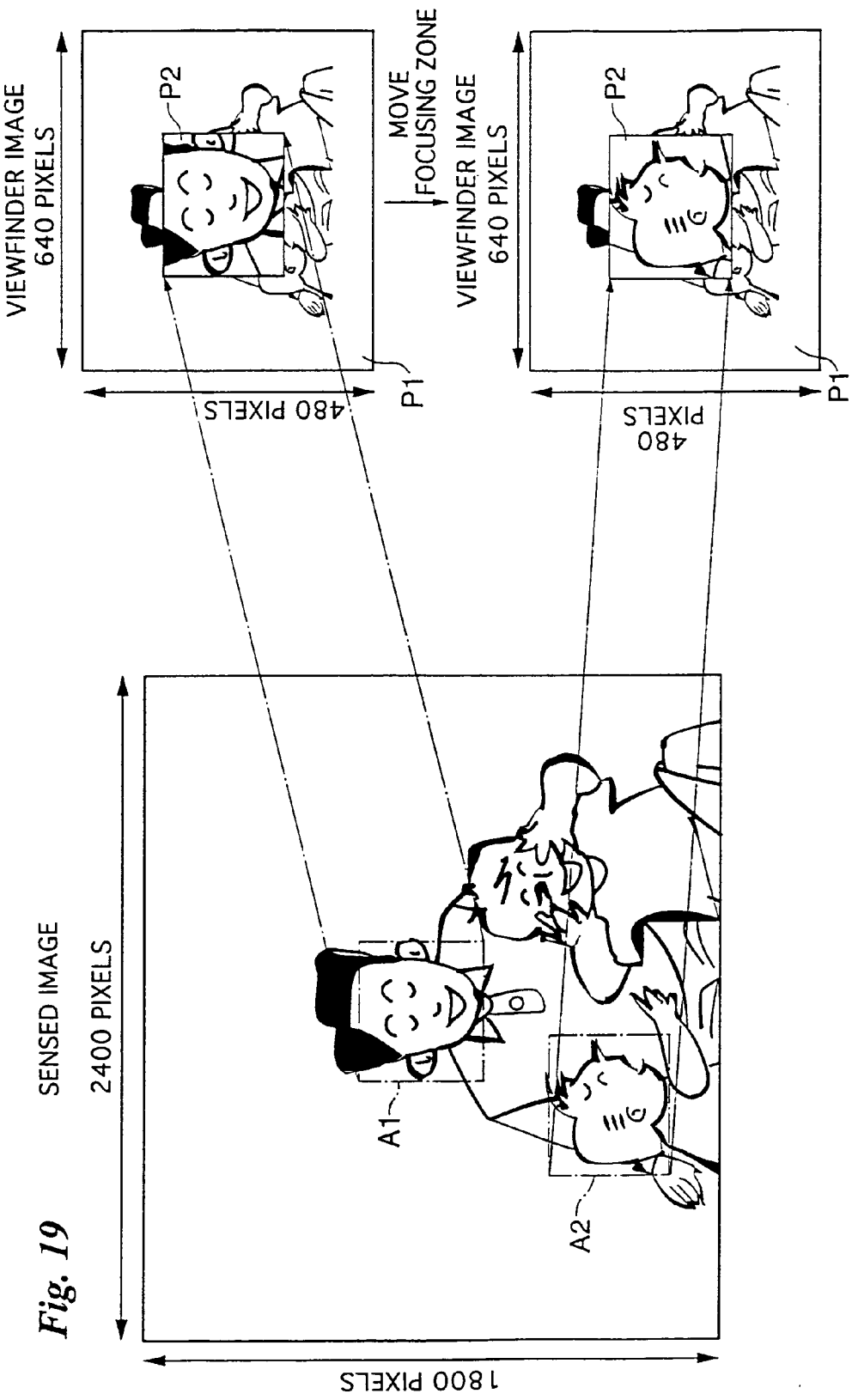
FIGS. 19 and 20 illustrate a sensed image and viewfinder images according to the fifth embodiment.
Figure 20:
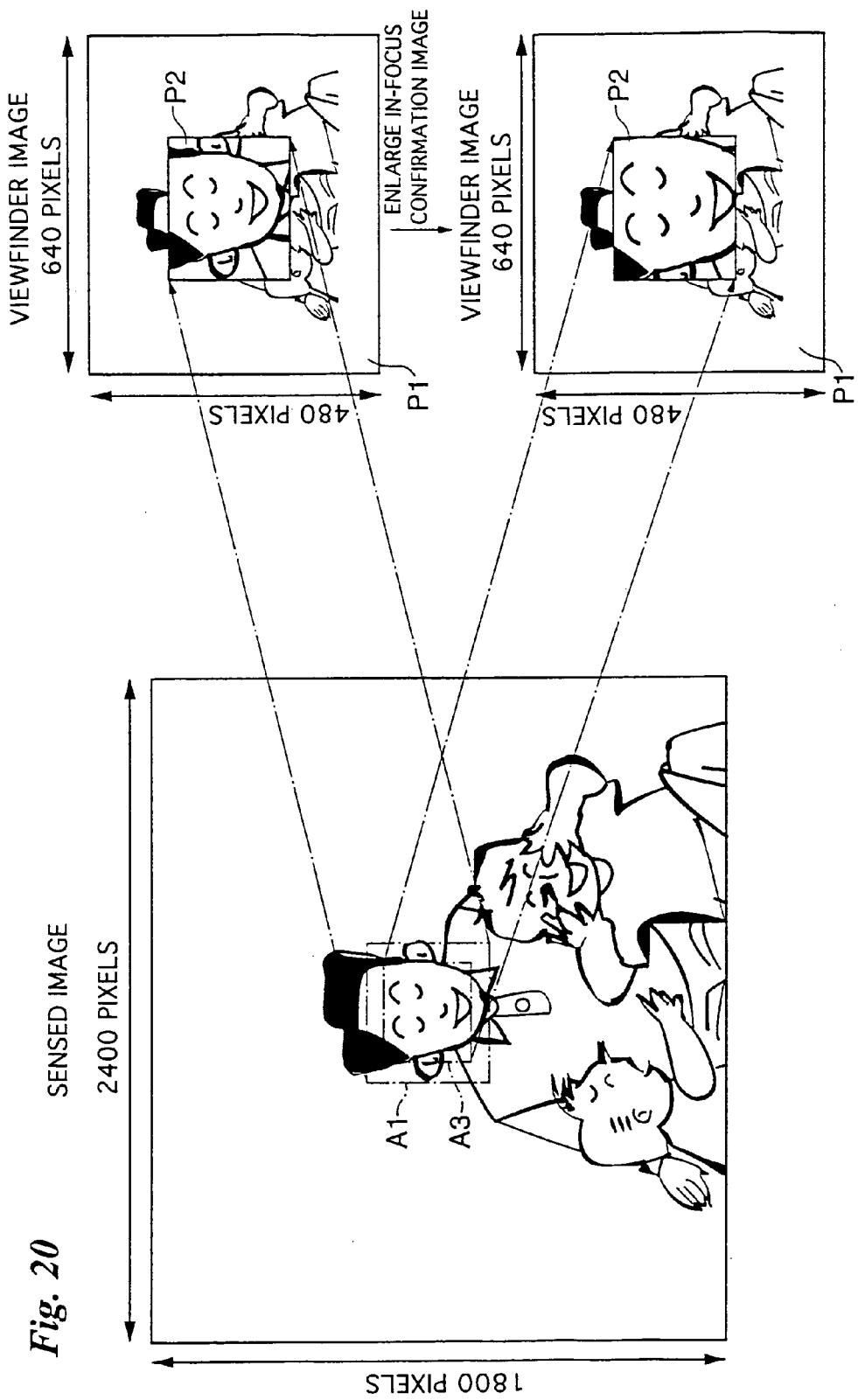

FIG. 18 is a flowchart illustrating part of the processing executed by the digital still camera for displaying a viewfinder image on the electronic viewfinder 8 of the camera. FIG. 18 corresponds to FIG. 1; processing steps in FIG. 18 identical with those shown in FIG. 1 are designated by like step numbers and need not be described again. FIGS. 19 and 20 illustrate a sensed image and viewfinder images displayed on the display screen of the electronic viewfinder 8.

As described earlier, the image of a subject is sensed and the angle-of-view confirmation image P1 is displayed on the electronic viewfinder 8 (step 24). If the display button 92 for displaying the in-focus confirmation image is pressed ("YES" at step 71), the image in the focusing zone A1 is displayed as the in-focus confirmation image P2 on the electronic viewfinder 8 in a form superimposed on the angle-of-view confirmation image P1, as described earlier (step 29).

If the display button 92 for displaying the in-focus confirmation image is not pressed ("NO" at step 71), it is determined whether the shutter-release button 1 has been pressed (step 72). If the shutter-release button 1 has not been pressed ("NO" at step 72), the processing of steps 21 to 71 is repeated. If the shutter-release button 1 is pressed ("YES" at step 72), then control proceeds to the processing shown in FIG. 4.

If an arrow on the position moving button 91 is pressed, a decision is rendered to the effect that a command to move the focusing zone has been applied ("YES" at step 73). If a command to move the focusing zone is applied to the digital still camera, the focusing zone moves in accordance with the move command applied. For example, the focusing zone A1 initially is situated at the approximate center of the sensed image, as illustrated in FIG. 19. Applying the move command moves the focusing zone from the approximate center of the sensed image (assume that the zone after being moved is a focusing zone A2) (step 74). As a result, the image in the moved focusing zone A2 is displayed as the in-focus confirmation image P2 on the electronic viewfinder 8 in a form superimposed on the angle-of-view confirmation image P1.

By pressing the enlargement/reduction button 93 for enlarging/reducing the in-focus confirmation image and the position moving button 91 in combination, a decision is rendered to the effect that a command to enlarge or reduce the size of the focusing zone has been applied ("YES" at step 75). If a command to enlarge or reduce the size of the focusing zone has been applied to the digital still camera, the focusing zone is enlarged or reduced in size in accordance with the command applied. For example, the focusing zone is reduced from A1 to A3, as shown in FIG. 20. The image within the reduced focusing zone A3 is displayed as the in-focus confirmation image P2 on the electronic viewfinder 8 in a form superimposed on the angle-of-view confirmation image P1. Since the image within the focusing zone A3, which is smaller than the focusing zone A1, becomes the in-focus confirmation image P2, the image P2 is enlarged as a result. Conversely, enlarging the size of the focusing zone reduces the size of the in-focus confirmation image P2.

The processing of steps 71, 26 to 29 and 73 to 76 is repeated until the shutter-release button 1 is pressed (step 77).

Since the position of the focusing zone can be moved, whether or not a desired portion of an image is in focus can be checked comparatively easily. Further, since the focusing zone can be enlarged or reduced in size, confirming focusing is comparatively simple.

(6) Sixth Embodiment

Figure 21:
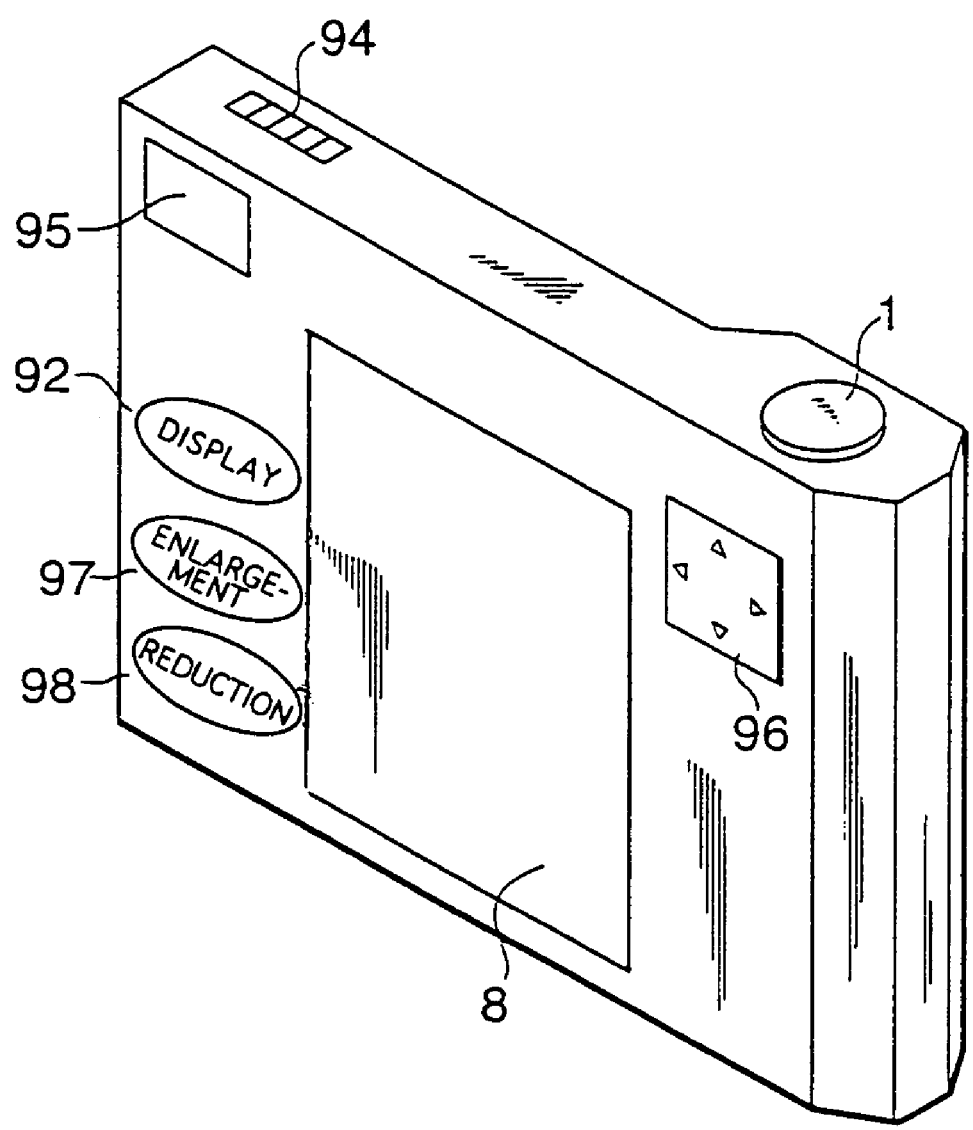
FIG. 21 is a perspective view of a digital still camera according to a sixth embodiment.
Figure 22:
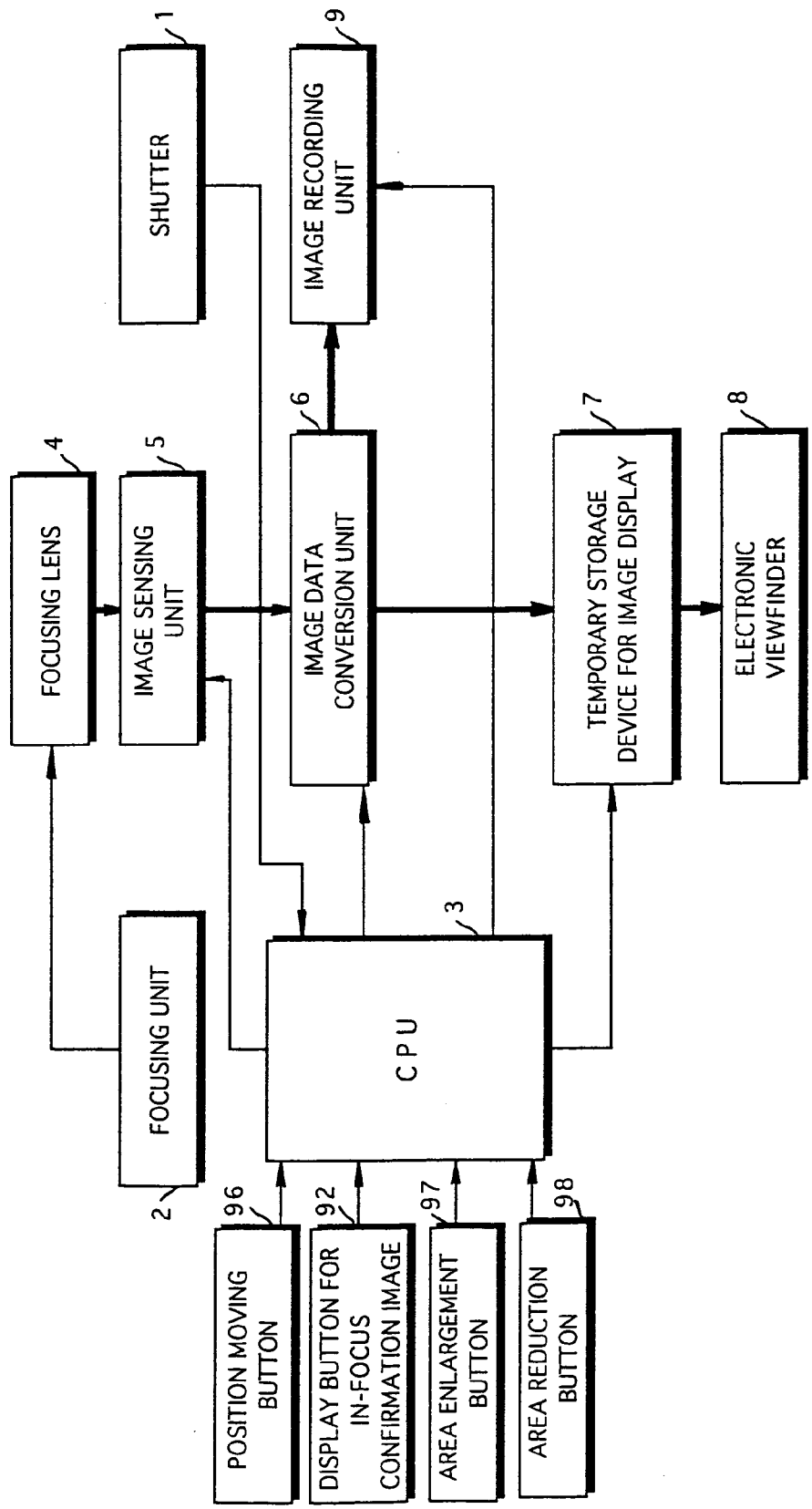
FIG. 22 is a block diagram illustrating the electrical construction of the digital still camera according to the sixth embodiment.
Figure 23:
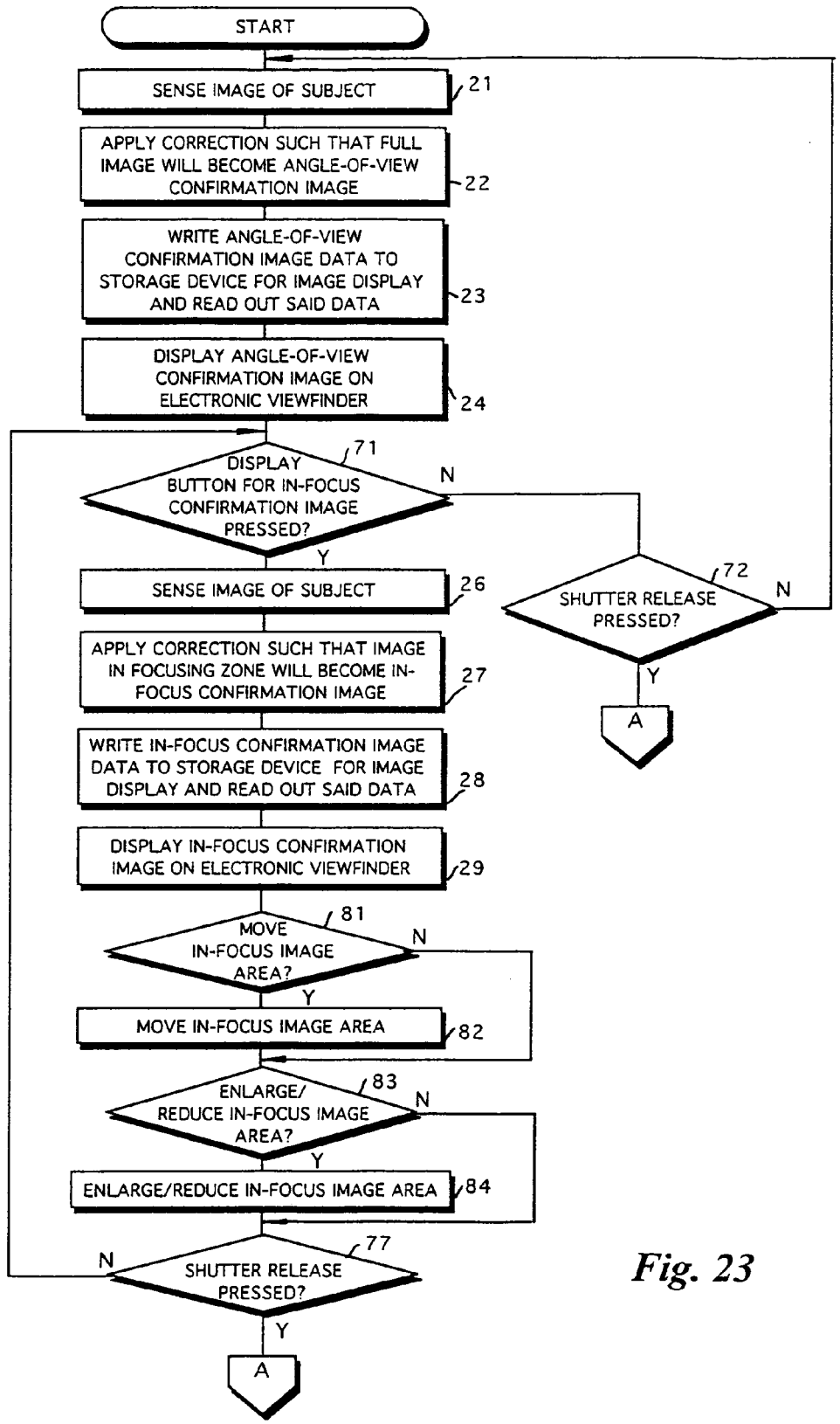
FIG. 23 is a flowchart illustrating processing executed by the digital still camera according to the sixth embodiment.

FIGS. 21 to 23 illustrate a sixth embodiment. In the sixth embodiment, the position at which the in-focus image display area is displayed and the size of this area can be changed.

FIG. 21 is a perspective view of a digital still camera as seen from the back thereof. Portions in FIG. 21 identical with those shown in FIG. 15 are designated by like reference characters and need not be described again.

Provided at the upper right of the display screen 99 of the electronic viewfinder is a position moving button 96 for applying a command to move the display position of in-focus image display area. Up, down, left and right arrows are formed on the position moving button 96 so as to be capable of being pushed.

Besides the in-focus confirmation image display button 92, provided on the left side of the display screen 99 of the electronic viewfinder are an area enlargement button 97 for applying a command to enlarge the size of the in-focus image display area, and an area reduction button 98 for applying a command to reduce the size of the in-focus image display area.

FIG. 22 is a block diagram illustrating the electrical construction of the digital still camera. Circuits in FIG. 22 identical with those shown in FIG. 16 are designated by like reference characters and need not be described again.

Signals indicative of commands from the area enlargement button 97 and area reduction button 98 enter the CPU 3 which, on the basis of these input signals, executes processing to move or enlarge/reduce the size of the in-focus image display area.

FIG. 23 is a flowchart illustrating processing for displaying the in-focus confirmation image of this digital still camera. FIG. 23 corresponds to the flowchart shown in FIG. 18; processing steps in FIG. 23 identical with those shown in FIG. 18 are designated by like step numbers and need not be described again.

Figure 24:
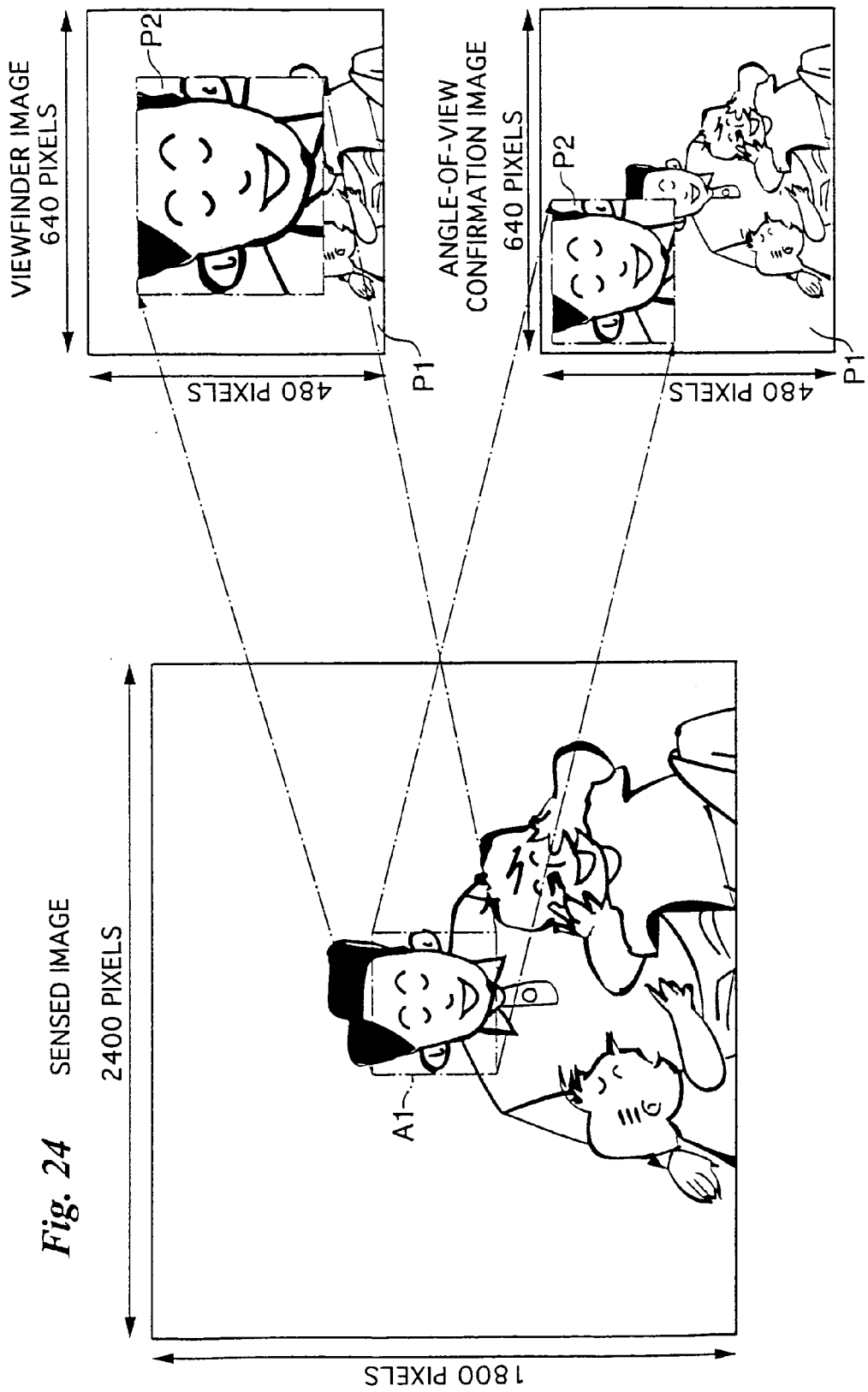
FIG. 24 illustrates a sensed image and a viewfinder image according to the seventh embodiment.

Pressing the position moving button 96 results in the issuance of a command for moving the in-focus image display area ("YES" at step 81). Pressing an arrow formed on the position moving button 96 causes the in-focus image display area to move in the direction indicated by the pressed arrow (step 82). The in-focus confirmation image P2 is caused to be displayed at the position to which the in-focus image display area has been moved. In the example depicted in FIG. 24, the in-focus image display area that was at the approximate center of the viewfinder has been moved to the upper left.

Since the in-focus image display area can be moved to a position desired by the user, the user can move this area to an easy-to-view position.

If the area enlargement button 97 or area reduction button 98 is pressed ("YES" at step 83), the in-focus image display area is enlarged or reduced in size (step 84). In the example depicted in FIG. 24, the in-focus image display area has been enlarged, as a result of which the in-focus confirmation image P2 has been enlarged as well. Enlarging the size of the in-focus confirmation image P2 makes it comparatively easy to check focusing. Further, since it is also possible to reduce the size of the in-focus confirmation image P2, the in-focus image display area can be prevented from being obtrusive owing to a size that is too large.

As many apparently widely different embodiments of the present invention can be made without departing from the spirit and scope thereof, it is to be understood that the invention is not limited to the specific embodiments thereof except as defined in the appended claims.

What is claimed is:

1. An image capturing apparatus, comprising:
    an image sensing unit configured to sense an image of a subject;
    an image data conversion unit configured to convert the image of the subject from the image sensing unit to an angle-of-view confirmation image and configured to convert a focusing zone of the image of the subject from the image sensing unit to an in-focus confirmation image;
    a focusing zone image data conversion unit configured to convert the image of the subject from the image sensing unit to the in-focus confirmation image;
    a focusing zone storage device configured to store the in-focus confirmation image from the focusing zone image data conversion unit;
    a temporary storage device configured to store the angle-of-view confirmation image and the in-focus confirmation image from the image data conversion unit;
    a display unit configured to display one or both of the angle-of-view confirmation image and the in-focus confirmation image retrieved from the temporary storage; and
    a controller configured to control the display unit to display the one or both of the angle-of-view confirmation image and the in-focus confirmation image,
    wherein a magnification of the in-focus confirmation image is greater than a magnification of the angle-of-view confirmation image, and
    wherein the temporary storage device is configured to store the angle-of-view confirmation image from the image data conversion unit and to store the in-focus confirmation image from the focusing zone storage device.

2. The image capturing apparatus of claim 1, wherein an area of the focusing zone is dynamically selectable anywhere within the image of the subject based on a user input.

3. The image capturing apparatus of claim 1, wherein the magnification of the in-focus confirmation image is dynamically selectable based on a user input.

4. The image capturing apparatus according to claim 1, wherein the temporary storage device includes a first image memory and a second image memory,
    wherein both the first and second memories are each capable of storing the angle-of-view confirmation image, and
    wherein both the first and second memories are each capable of storing the in-focus confirmation image.

5. The image capturing apparatus according to claim 1, wherein the controller is configured to display the in-focus confirmation image on an entirety of the display unit.

6. The image capturing apparatus according to claim 1, wherein the controller is configured to superimpose the in-focus confirmation image over the angle-view-confirmation image on the display unit.

7. The image capturing apparatus according to claim 1, wherein both the angle-of-view confirmation image and the in-focus confirmation image are derived from a single frame of the image of the subject.

8. The image capturing apparatus according to claim 1, wherein the image capturing apparatus is a still image capturing apparatus.

* * * * *